(12) United States Patent
Lee et al.

(10) Patent No.: US 12,736,738 B2
(45) Date of Patent: *Sep. 15, 2026

(54) LIGHTING MODULE AND REFRIGERATOR HAVING DISPENSER

(71) Applicant: LG Electronics Inc., Seoul (KR)

(72) Inventors: Sunghun Lee, Seoul (KR); Hoon Kim, Seoul (KR); Minki Kim, Seoul (KR); Jihoon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 18/829,758

(22) Filed: Sep. 10, 2024

(65) Prior Publication Data

US 2024/0427074 A1 Dec. 26, 2024

Related U.S. Application Data

(63) Continuation of application No. 17/588,646, filed on Jan. 31, 2022, now Pat. No. 12,135,449.

(30) Foreign Application Priority Data

Feb. 10, 2021 (KR) ........................ 10-2021-0019135
Feb. 10, 2021 (KR) ........................ 10-2021-0019151

(51) Int. Cl.
*F21V 8/00* (2006.01)
*F25C 5/20* (2018.01)
(Continued)

(52) U.S. Cl.
CPC .............. *G02B 6/0058* (2013.01); *F25C 5/22* (2018.01); *F25D 23/126* (2013.01); *F25D 27/00* (2013.01);
(Continued)

(58) Field of Classification Search
None
See application file for complete search history.

(56) References Cited

U.S. PATENT DOCUMENTS 9,612,492 B2 * 4/2017 Yang ................. G02F 1/136209
9,612,700 B2 4/2017 Doering
(Continued)

FOREIGN PATENT DOCUMENTS

CN 102132118 A 7/2011
CN 110968003 A 4/2020
(Continued)

OTHER PUBLICATIONS

Extended European Search Report in European Appln. No. 24196954.2, mailed on Nov. 21, 2024, 8 pages.
(Continued)

*Primary Examiner* — Paul R Durand
*Assistant Examiner* — Michael J. Melaragno
(74) *Attorney, Agent, or Firm* — Fish & Richardson P.C.

(57) ABSTRACT

Provided is a lighting assembly including an upper body that defines a top surface thereof; a lower body coupled to a lower portion of the upper body and defining a bottom surface thereof; a light diffusion member coupled to the upper body and the lower body, the light diffusion member including a first surface facing the upper body, a second surface facing the lower body, and a third surface that has a curved surface and is exposed to an outside of the light diffusion member; a light guide made of a light transmissive material, the light guide being in contact with the light diffusion member; and a light-emitting diode (LED) disposed to face a surface of the light guide.

20 Claims, 31 Drawing Sheets

(51) Int. Cl.
*F25D 23/12* (2006.01)
*F25D 27/00* (2006.01)

(52) U.S. Cl.
CPC ...... *G02B 6/0073* (2013.01); *F25D 2327/001* (2013.01)

(56) References Cited

U.S. PATENT DOCUMENTS

2011/0072842 A1* 3/2011 Park ........................ F25D 27/00 62/340
2011/0174008 A1* 7/2011 Kim ...................... F25D 23/126 62/264
2012/0103001 A1 5/2012 Krause et al.
2014/0239010 A1 8/2014 Hwang et al.
2015/0185842 A1* 7/2015 Picciotto ............. G06F 3/04144 345/173
2015/0286302 A1* 10/2015 Kim ...................... G06F 3/0488 345/173
2016/0103649 A1* 4/2016 Yoshitani .............. G06F 3/1446 345/694
2016/0117022 A1 4/2016 Kim et al.
2016/0131420 A1* 5/2016 Park ...................... F25D 23/028 62/267
2016/0178277 A1* 6/2016 Park ..................... H03K 17/962 345/173
2016/0186985 A1* 6/2016 Kim ..................... H03K 17/962 29/428
2016/0188025 A1* 6/2016 Park ........................ F25D 23/02 345/173
2016/0188093 A1* 6/2016 Kim ...................... F25D 29/005 345/173
2016/0209105 A1* 7/2016 Grzyb ................. F21V 33/0012
2018/0003428 A1* 1/2018 Kwon ...................... H05K 1/14
2018/0058747 A1* 3/2018 Yang ..................... G06F 3/0412
2018/0164030 A1* 6/2018 Lee ...................... G02B 6/0095
2018/0164945 A1* 6/2018 Yang .................. H03K 17/9643
2018/0373375 A1* 12/2018 Park ..................... H03K 17/964
2019/0011177 A1 1/2019 Lee et al.
2019/0098748 A1* 3/2019 Guo ...................... G06F 1/1688
2019/0346198 A1 11/2019 Lux et al.
2020/0041195 A1* 2/2020 Park ...................... G06F 3/0414
2020/0266845 A1* 8/2020 Kumar ................. H04B 1/3888
2021/0316981 A1* 10/2021 Kwon ...................... B67D 1/07
2022/0397718 A1* 12/2022 Lee ......................... F25D 27/00
2026/0049759 A1* 2/2026 Cheon ..................... F25D 27/00

FOREIGN PATENT DOCUMENTS

EP 1785683 A2 5/2007
RU 2602283 C2 11/2016
RU 2658383 C1 6/2018
WO 2007/119931 A1 10/2007

OTHER PUBLICATIONS

Office Action in Australian Appln. No. 2024204256, mailed on Sep. 24, 2025, 6 pages.

Office Action in Chinese Appln. No. 202311484283.7, mailed on Apr. 11, 2026, 16 pages (with English translation).

* cited by examiner

FIG. 3

LIGHTING MODULE AND REFRIGERATOR HAVING DISPENSER

CROSS-REFERENCE TO RELATED APPLICATIONS

The present application is a continuation of U.S. application Ser. No. 17/588,646, filed on Jan. 31, 2022, which claims priority under 35 U.S.C. 119 and 35 U.S.C. 365 to Korean Patent Application No. 10-2021-0019135, filed on Feb. 10, 2021, and Korean Patent Application No. 10-2021-0019151, filed on Feb. 10, 2021, the disclosures of which are hereby incorporated by reference in their entirety.

TECHNICAL FIELD

The present disclosure relates to a dispenser and a refrigerator provided with the dispenser.

BACKGROUND

Refrigerators are home appliances for storing foods in an internal storage space that is shielded by a door, at a low temperature. For this, the refrigerator cools the inside of the storage space using cool air generated through heat-exchange with a refrigerant that circulates a cooling cycle to store the foods in an optimum state.

In some examples, refrigerators have become increasingly multi-functional with changes of dietary habits and gentrification of products. In some cases, refrigerators can include various structures and convenience devices for convenience of users and for efficient use of internal spaces.

In some examples, a dispenser that is capable of being operated from the outside can be provided on a front surface of a door of the refrigerator. In some cases, water purified by a filter device can be dispensed through the dispenser. In some cases, the dispenser can be connected to an ice maker that makes ice and can dispense ice through operation of the dispenser.

In some examples, a display for displaying operation states of the dispenser can be provided at one side of the dispenser.

In some cases, a device for sterilizing a tube or tank connected to the dispenser using ultraviolet light can be provided so that sterilized water is dispensed through the dispenser.

In some cases, the display assembly can be provided separately at one side of the display, deteriorating assemblability and productivity. In some cases, the provided display assembly can be mounted on one side of the dispenser, increasing a size of the display itself, and an outer appearance may not be good.

In some cases, the display assembly can be separately disposed at the outside of the dispenser, and intuitive operation for the user and displaying of the operation state may be difficult.

For example, there may be no structure that intuitively shows the sterilization state of the nozzle tube or the operation state of the nozzle tube, and thus, the operation reliability and sanitary state may not be transmitted to the user.

In some examples, the configuration for sterilization of the nozzle tube may not operate normally or may not be recognized even if it is fixed or damaged.

SUMMARY

The present application describes a dispenser having a simple and compact structure to improve assemblability and productivity and a refrigerator having the dispenser.

The present application further describes a dispenser having a simple and neat outer appearance structure and a refrigerator having the dispenser.

The present application further describes a dispenser capable of intuitively inducing a user's operation and displaying an operation state, and a refrigerator having the dispenser.

The present application further describes a dispenser capable of intuitively transmitting an operation state of performing a nozzle sterilization operation to a user through a displaying portion and a refrigerator having the dispenser.

The present application further describes a dispenser provided in a ring shape and provided with a ring light capable of emitting light with uniform brightness from an outer surface of a dispensing portion and a refrigerator having the dispenser.

The present application further describes a dispenser provided with a display that is provided on a touch assembly, displays an operation state, has a simple processing method, and is capable of ensuring sufficient visibility, and a refrigerator having the dispenser.

The present application further describes a dispenser that includes a capacitive touch assembly with excellent touch sensitivity and an operation portion maintaining constant touch sensitivity, and a refrigerator having the dispenser.

According to one aspect of the subject matter described in this application, a lighting assembly includes an upper body that defines a top surface thereof, a lower body coupled to a lower portion of the upper body and defining a bottom surface thereof, a light diffusion member coupled to the upper body and the lower body, the light diffusion member including a first surface facing the upper body, a second surface facing the lower body, and a third surface that has a curved surface and is exposed to an outside of the light diffusion member, a light guide made of a light transmissive material, the light guide being in contact with the light diffusion member, and a light-emitting diode (LED) disposed to face a surface of the light guide.

Implementations according to this aspect can include one or more of the following features. For example, the light guide can include a round portion disposed along a circumference of a dispensing portion body through which a nozzle that is configured to discharge purified water passes, and an extension portion extending from a rear end of the round portion to the LED.

In some implementations, the lighting assembly can further comprise a pattern portion provided at an inner circumferential surface of the round portion and configured to reflect an incident light to an outside. The pattern portion can have a concave shape, in which a groove is repeated, and the groove can have a width that gradually increases from the rear end of the round portion toward a front side of the round portion and can be repeated at an interval that gradually decreases from the rear end of the round portion toward the front side of the round portion.

In some implementations, the light diffusion member can include a diffusion member base configured to support a bottom surface of the light guide, a front extension portion extending upward from a front end of the diffusion member base, the front extension portion being in contact with a front surface of the light guide; and an exposure portion protruding from the front extension portion and being exposed to an outside of the dispensing portion body.

In some implementations, the extension portion can be disposed at a position higher than the round portion, and the light guide can comprise a connection portion configured to couple the round portion to the extension portion. The connection portion can extend to an end of the round portion and can be disposed to be inclined.

In some implementations, a through-hole, through which the connection portion passes, can be defined at the bottom surface of the upper body, a light substrate on which the LED can be provided is mounted on the top surface of the upper body, and the round portion can be disposed at the bottom surface of the upper body.

In some implementations, a support, configured to support an inner surface of the round portion, can be disposed at the bottom surface of the upper body. The support can extend downward and can have a curvature corresponding to the round portion.

In some implementations, a guide restriction portion, configured to fix an end of the extension portion to a position facing a front surface of the LED, can be disposed inside the upper body.

According to another aspect, a dispenser device includes a dispenser case, a touch case provided in the dispenser case and including a manipulation portion having a curved section on a front surface thereof, the lighting assembly according to any one of the implementations disclosed herein, a touch assembly provided behind the touch case and configured to be touched by a user, and a nozzle disposed below the touch assembly and configured to discharge water downward. The touch assembly can include, a first touch sensor and a second touch sensor provided at a touch substrate having a flat plate shape, a first transfer member and a first elastic member provided between the first touch sensor and the manipulation portion, a second transfer member and a second elastic member provided between the second touch and the manipulation portion, and an inclination portion disposed at the second elastic member.

Implementations according to this aspect can include one or more of the following features. For example, the touch case can have a rounded front surface, the first elastic member can be disposed at a center of a rear surface of the manipulation portion, and the second elastic member can be disposed to be spaced a predetermined distance apart from each of both left and right sides of the first elastic member.

In some implementations, the inclination portion can be inclined closer to the rear surface of the manipulation portion in a direction away from the first elastic member.

In some implementations, the touch assembly can further comprise a guide member provided at a front surface of the touch substrate and be configured to guide light emitted from a light emitting member provided at the touch substrate. In some implementations, a front surface of the guide member can have a rounded shape corresponding to the rear surface of the manipulation portion, a guide hole defining a space configured to accommodate the first elastic member and the second elastic member, can be defined in the guide member, and the first elastic member and the second elastic member can further protrude forward than an open front surface of the guide hole.

In some implementations, the touch assembly can further include a light emitting member, a blocking layer configured to block light emitted from the light emitting member, and a display configured to transmit the light by removing the blocking layer at a position corresponding to the light emitting member.

In some implementations, the guide member can have a light hole extending from the front surface of the touch substrate to the rear surface of the manipulation portion and be configured to guide the light emitted from the light emitting member toward the display.

In some implementations, a vertical length of the light hole can be greater than a vertical length of the display.

In some implementations, the display can be configured to transmit the light by removing a portion of the blocking layer through laser processing.

According to another aspect, a refrigerator comprising a dispenser device can include a cabinet defining a storage space, a door configured to open and close the storage space, a dispenser provided at a front surface of the door and configured to dispense ice, a dispenser case mounted on the door and defining a recessed space, an ice chute provided in the recessed space and defining a passage through which the ice is dispensed, and a lighting assembly disposed to surround the ice chute. In some implementations, the lighting assembly can include a light substrate on which a first LED and a second LED are installed, a plurality of extension portions made of a light transmissive material, the plurality of extension portions disposed to face the first LED and the second LED, respectively, and a light guide coupled to each of the extension portions and including a round portion that has a curved section surrounding the ice chute. The light guide can be configured to transmit and emit light emitted from the first and the second LEDs.

Implementations according to this aspect can include one or more of the following features. For example, the dispenser can include a nozzle configured to discharge purified water downward, and a dispensing portion body through which the nozzle passes. In some implementations, the dispensing portion body can have a cylindrical outer surface, and the round portion of the light guide can have a curvature corresponding to the dispensing portion body. In some implementations, the light guide can be configured to emit light in a ring shape from the cylindrical outer surface of the dispensing portion body.

In some implementations, the dispensing portion body includes an upper body on which the light substrate is mounted, and a lower body which is disposed below the upper body and on which the nozzle is mounted. In some implementations, the light guide can be disposed between a lower end of the upper body and an upper end of the lower body.

In some implementations, the lighting assembly can further comprise a diffusion member provided at an outside of the light guide and be configured to diffuse the light emitted from the light guide. In some implementations, the diffusion member can be disposed between a touch assembly and the lighting assembly.

BRIEF DESCRIPTION OF THE DRAWINGS

FIG. 3 is a partial enlarged view illustrating an example state of a dispensing portion of the dispenser.

DETAILED DESCRIPTION

Hereinafter, detailed implementations of the present disclosure will be described in detail with reference to the accompanying drawings. However, the scope of the present disclosure is not limited to proposed implementations of the present invention, and other regressive inventions or other implementations included in the scope of the spirits of the present disclosure can be easily proposed through addition, change, deletion, and the like of other elements.

In some implementations, the implementation will be described with an example of a side-by-side type (or double-door type) refrigerator in which a pair of doors are disposed at both left and right sides for convenience of explanation and understanding, and it should be noted in advance that the present disclosure is applicable to all refrigerators provided with a dispenser.

Figure 1:
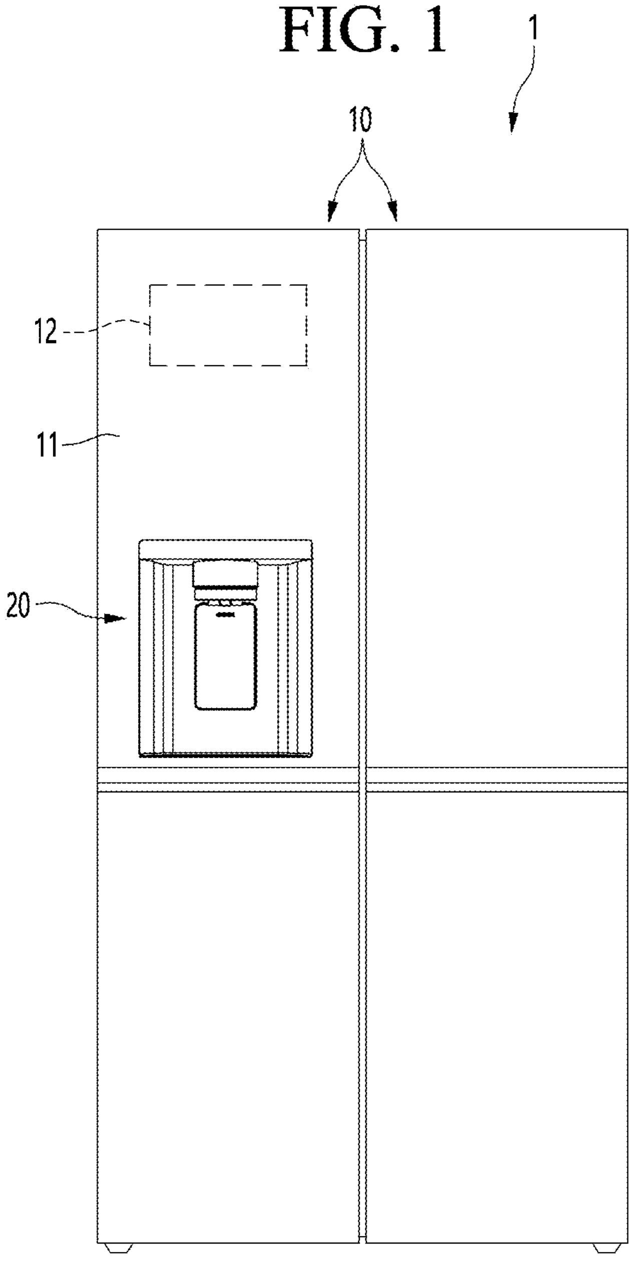
FIG. 1 is a front view illustrating an example state of a refrigerator.

A direction will be defined prior to the explanation. In FIG. 1, a direction in which an outer plate of a door is disposed can be referred to as a front direction, a backward direction with respect to the outer plate is referred to as a rear direction, a direction facing a bottom surface on which the refrigerator is installed is referred to as a downward direction, and a direction away from the bottom surface on which the refrigerator is installed is referred to as an upward direction.

FIG. 1 is a front view illustrating an example state of a refrigerator.

In some implementations, a refrigerator 1 includes a cabinet defining a storage space and a door 10 coupled to the cabinet to open and close the storage space. Here, an outer appearance of the refrigerator 1 can be defined by the cabinet and the door 10.

The door 10 can be arranged side by side at both left and right sides and can open and close a space partitioned into both the left and right sides. For example, the storage space of the cabinet can be divided into both the left and right sides to define a freezing compartment and a refrigerating compartment, and the door 10 can include a freezing compartment door that opens and closes the freezing compartment and a refrigerating compartment door that opens and closes the refrigerating compartment.

The door 10 can define most of an outer appearance of a front surface of the refrigerator 1. To define the outer appearance of the refrigerator 1, a front surface of the door 10 can be defined by an outer plate 11. The outer plate 11 can be made of, for example, a metal material or a material having a metal texture.

In some cases, a dispenser 20 can be provided in the door 10. The dispenser 20 can be disposed at the front surface of the door 10 to dispense purified water in a state in which the door 10 is closed.

The dispenser 20 can be provided to have the same or similar color and texture to the outer plate 11. For example, when the outer plate 11 is made of a metal material, main components defining an outer appearance of the dispenser 20 can be made of a metal material or a plastic material, and a metal texture coating or film can be attached to a surface thereof.

An ice maker 12 that makes and stores ice can be provided above the dispenser 20, and the ice maker 12 can be connected to the dispenser 20 to dispense ice through operation of the dispenser 20.

The ice maker 12 can be provided inside the freezing compartment or on a rear surface of the freezing compartment door. In some examples, when the dispenser 20 is provided in the refrigerating compartment door, the ice maker 12 can be provided in an insulated ice making chamber on a rear surface of the refrigerating compartment door.

The dispenser 20 can be disposed at a position at which the user's operation is easy, and the dispenser 20 can be configured so that an operation state is displayed.

Hereinafter, the structure of the dispenser 20 will be described in more detail with reference to the drawings.

Figure 2:
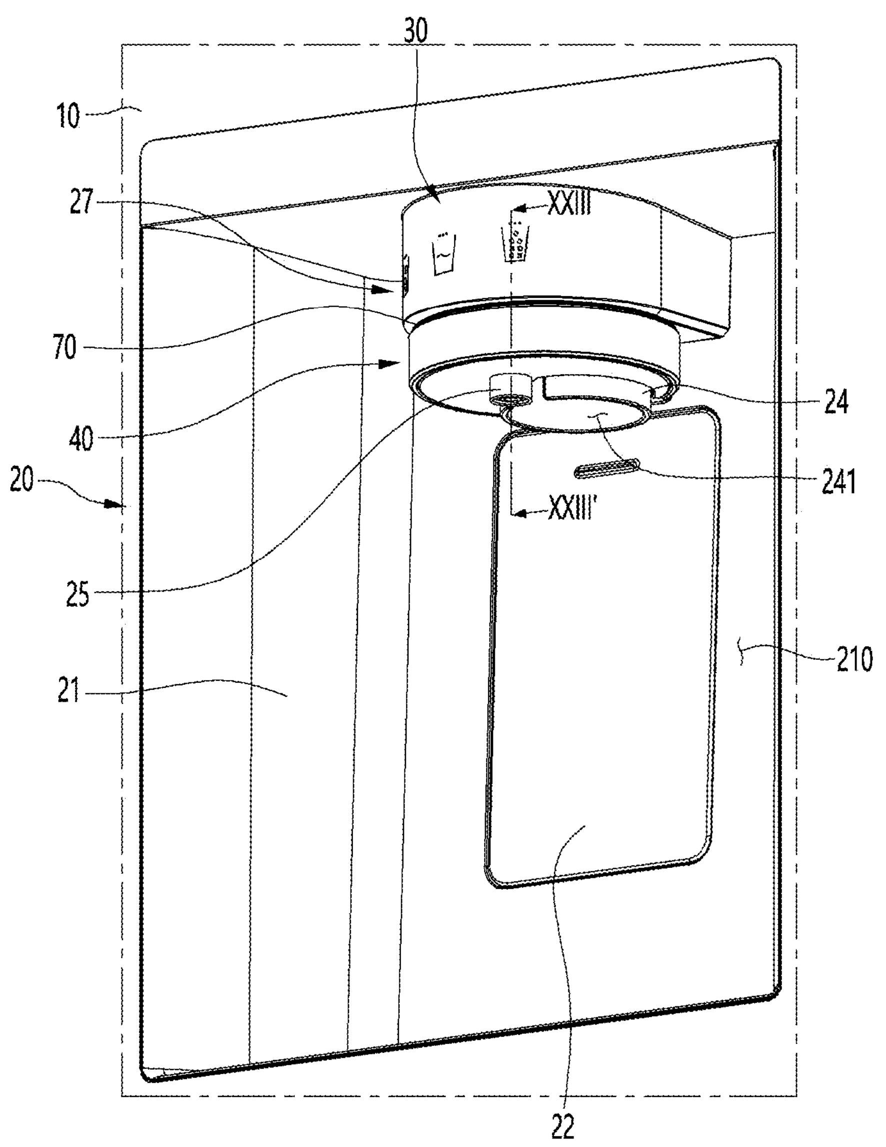
FIG. 2 is a perspective view illustrating an example state of a dispenser mounted on a door of the refrigerator.
Figure 3:
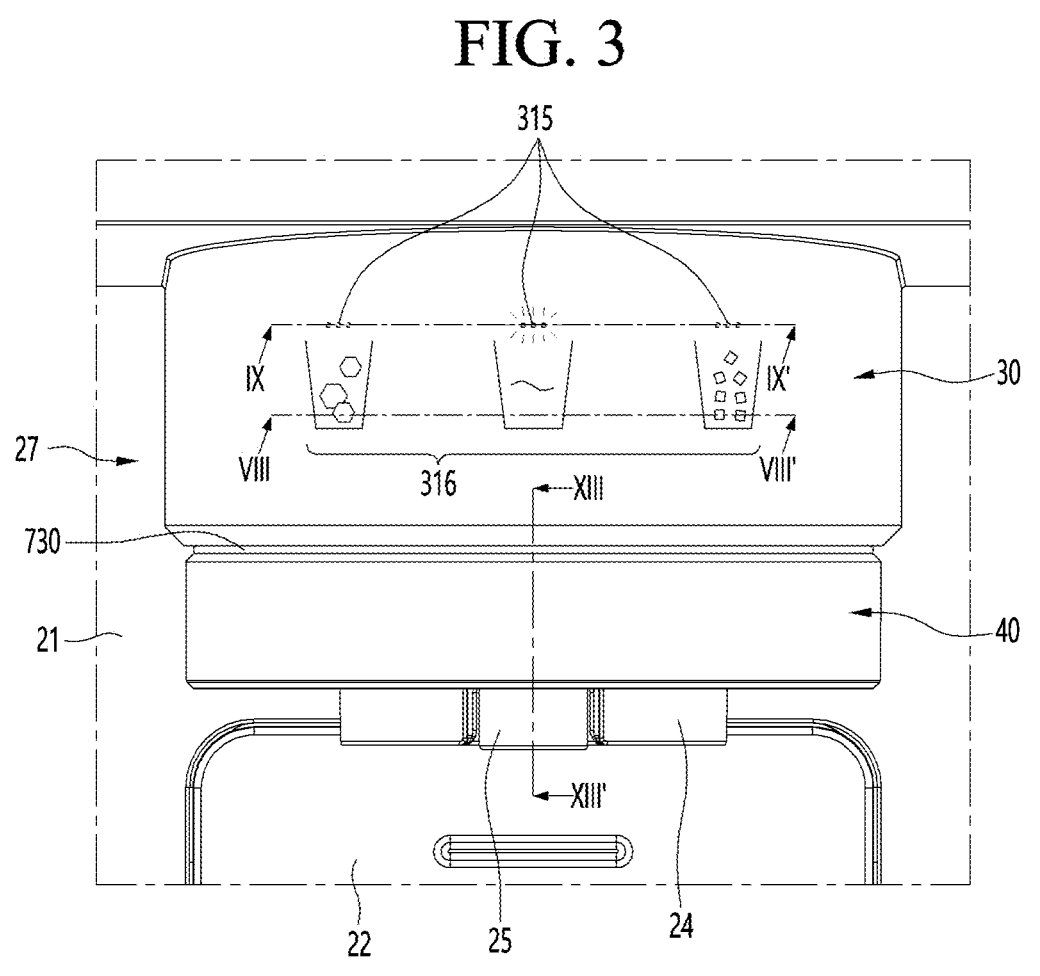

FIG. 2 is a perspective view illustrating an example state of the dispenser mounted on the door of the refrigerator. FIG. 3 is a partial enlarged view illustrating an example state of the dispensing portion of the dispenser.

In some implementations, the dispenser 20 can be mounted to be exposed at the front surface of the door 10 and can be configured to dispense water or ice in an inner recessed space.

In detail, the dispenser 20 can be mounted so that a dispenser case 21 defining the recessed space 210 shields an opening of the outer plate 11. A space through which the user accesses a cup or container can be defined by the dispenser case 21, and a space from which water or ice is dispensed can be provided.

In some examples, a lever 22 can be provided at a center of the inner surface of the recessed space 210. The dispensing of the water or ice through the dispenser 20 can start by an operation of the lever 22. An upper end of the lever 22 can rotate about a lower end as an axis, and the lever 22 can be rotatably mounted to the dispenser case 21.

An outlet 241 of an ice chute 24 from which ice is discharged can be disposed vertically above the lever 22, and a water outlet 25 through which the purified water is discharged can be disposed at a front end of the ice chute 24. That is, centers of the lever 22, the ice chute 24, and the water outlet 25 can be disposed at the same vertical plane. Thus, when the lever 22 is operated using the cup or container, the ice or water discharged through the ice chute 24 and the water outlet 25 can naturally flow toward the cup or container.

In some examples, a touch assembly 30 and a lighting assembly 40 can be disposed vertically above the lever 22. An operation state of the dispenser 20 can be displayed on the touch assembly 30, and a user can input an operation into the touch assembly 30.

In detail, the touch assembly 30 can be disposed above the lighting assembly 40 and can be disposed at an upper end of the dispenser 20. In some examples, the touch assembly 30 can define a portion of an outer appearance of an upper portion of the dispenser 20. In some examples, the ice chute 24 can be disposed inside the touch assembly 30 and can be configured to shield the ice chute 24 from the front.

The touch assembly 30 can be provided in a rounded shape when viewed from the front, and a touch portion 316 for the user's touch and a display 315 for displaying an operation state can be disposed at the rounded front surface.

The touch portion 316 can set a function of the dispenser by the user's touch and the function can be provided on a front surface of the touch assembly 30 by printing or surface processing. The touch portion 316 can include a plurality of portions, and the display 315 can display a number corresponding to a position corresponding to the touch portion 316.

For example, the touch portion 316 can be divided into three portions that are continuously arranged in a horizontal direction and can be configured to allow the user to select each of cube-shaped ice, purified water, and crushed ice. The touch portion 316 can be configured so that the selected function appears in the form of a picture or text so that the user intuitively confirms the selected function. In some examples, the display 315 can be formed above each of the touch portions 316, and the display 315 corresponding to the touch portion 316 selected by the user can emit light so that the user's selected function and operation state are visualized.

The lighting assembly 40 can be disposed at a lower end of the touch assembly to define a portion of an outer appearance of an upper portion of the dispenser 20. The lighting assembly 40 can also be provided in a round shape having a curvature corresponding to that of the touch assembly 30, and extending the lower end of the touch assembly 30. The touch assembly 30 and the lighting assembly 40 can be provided in a coupled state, and the ice chute 24 and the nozzle assembly 50 can be disposed inside the lighting assembly 40. Thus, the touch assembly 30, the lighting assembly 40, and components provided therein can be referred to as the dispensing portion 27.

In some examples, the ice chute 24 and the water outlet 25 can protrude further downward than the lower end of the lighting assembly 40 so that at least a portion thereof is exposed through the recessed space 210.

The lighting assembly 40 can include a ring light 730. The ring light 730 can indicate the operation state of the dispenser 20 and can be configured as a portion of a diffusion member 70 to be described below. In some cases, the ring light 730 can be disposed along a circumference of the lighting assembly 40. For example, the lighting assembly 40 can be disposed between the lower end of the touch assembly 30 and the lower end of the lighting assembly 40 and can emit light along an outer circumference of the dispensing portion 27.

The ring light 730 can be provided between the touch assembly 30 and the lighting assembly 40. In some cases, only a portion of the ring light 730 may be exposed to the outside, and other components constituting the lighting assembly 40 can be disposed inside the touch assembly 30 so as not to be exposed to the outside.

In some examples, the ring light 730 can emit light in various colors and can display various operation states of the refrigerator 1 and the dispenser in connection with a light emitting pattern or a change in light emission state.

Hereinafter, a structure of the dispenser 20 will be described in more detail.

Figure 4:
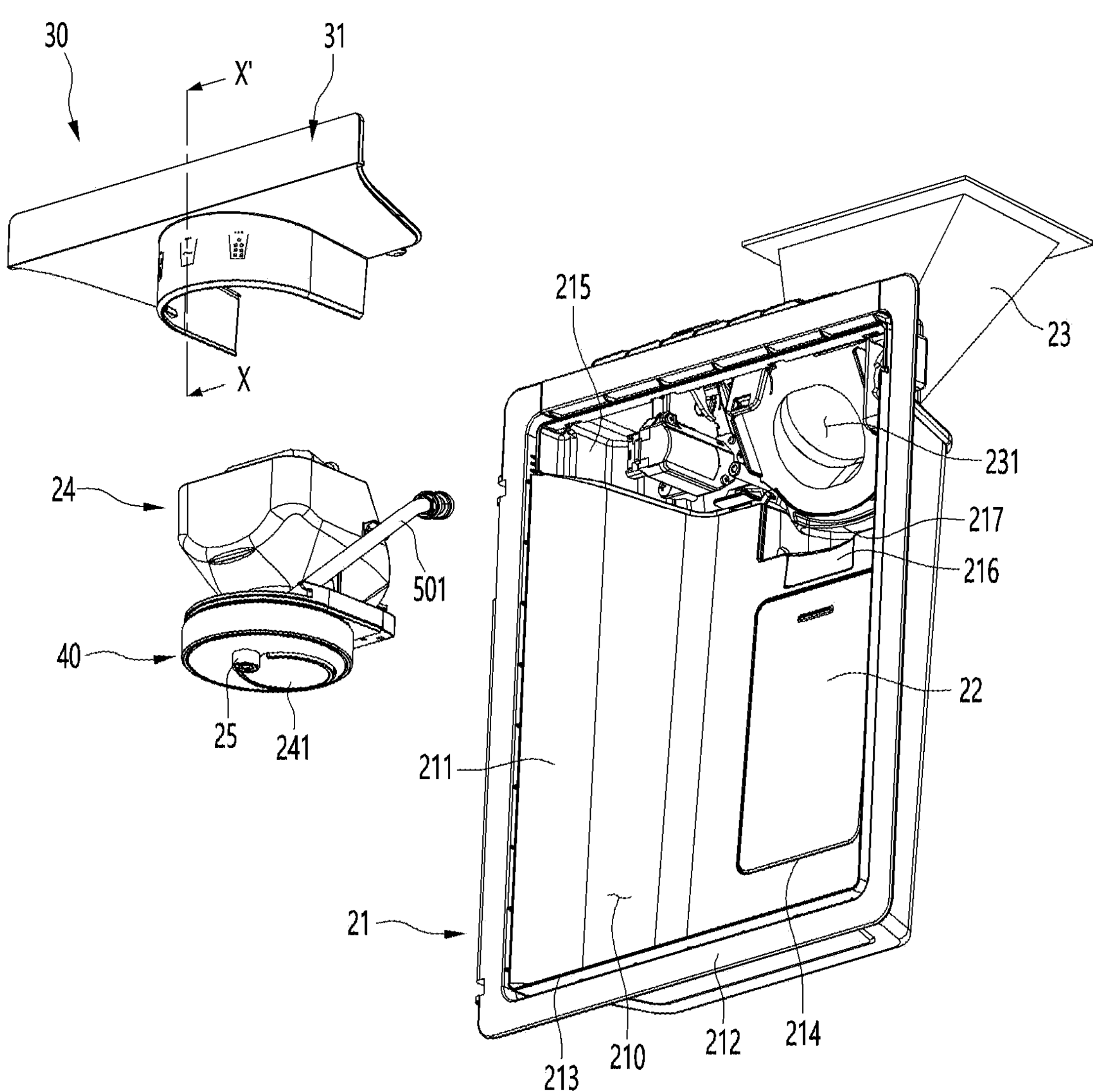
FIG. 4 is an exploded perspective view illustrating an example state of the dispenser.

FIG. 4 is an exploded perspective view illustrating an example state of the dispenser.

In some implementations, the dispenser 20 may include the dispenser case 21, the touch assembly 30, and the lighting assembly 40 as a whole.

The dispenser case 21 can define an overall shape of the dispenser 20, and various components including the touch assembly 30 and the lighting assembly 40 can be mounted therein. In some cases, the dispenser case 21 can include a recessed portion 211 defining an inner surface defining the recessed space 210, and a case edge 212 provided along a circumference of the recessed portion 211.

The case edge 212 can be in close contact with a rear surface of the outer plate 11. In some cases, a plate insertion groove 213 can be defined between the case edge 212 and the circumference of the recessed portion 211. An end bent along a circumference of an opening of the outer plate 11 can be inserted into the plate insertion groove 213, and the outer plate 11 and the dispenser case 21 can be coupled to each other.

In some examples, the recessed portion 211 can provide the recessed space 210. The recessed space 210 can be defined in a shape of which a left and right width become narrower toward the rear side, and a lever mounting portion 214 on which the lever 22 is mounted can be recessed in a rear wall surface of the recessed portion 211. The lever 22 has a lower end that is coupled to a shaft at the inside of the lever mounting portion 214 to rotate by pressing an upper end thereof and can be supported at the rear side by a spring 221 (see FIG. 19). Thus, the lever 22 can return to its initial position by elastic force of the spring 221 after the operation. In some cases, in the non-manipulated state of the lever 22, an upper end of the lever 22 can be disposed at a lower end of a rear surface of the ice chute 24.

In some examples, the touch mounting portion 215 to which the touch assembly 30 is mounted can be disposed at both left and right sides of an upper end of the recessed portion 211. The touch mounting portion 215 can be recessed, and an end of the touch case 31 constituting the touch assembly 30 can be inserted into the touch mounting portion 215.

In some examples, a chute support 216 can be disposed at the rear surface of the recessed portion 211. The chute support 216 can be disposed above the lever mounting portion 214 and can be recessed so that the rear surface of the ice chute 24 is seated. Thus, the ice chute 24 can be mounted in a state of being stably supported inside the dispensing portion 27 and can be maintained at an accurate mounting position.

In some examples, a lighting assembly mounting portion 217 can be disposed above the chute support 216. The lighting assembly mounting portion 217 can be recessed backward so that a lower end of the lighting assembly 40 is inserted. In some cases, the lighting assembly mounting portion 217 can be recessed to a size corresponding to a width of a rear end of the lighting assembly 40 to accommodate the rear end of the lighting assembly 40. Thus, the rear end of the lighting assembly 40 can be inserted and mounted in the lighting assembly mounting portion 217. In some cases, the lighting assembly mounting portion 217 can provide a space in which the lighting module 42 constituting the lighting assembly 40 is accommodated.

A connection passage 23 can be provided in a top surface of the dispenser case 21. The connection passage 23 can provide a passage through which the ice made in the ice maker 12 moves to be dispensed to the dispenser 20 and can extend obliquely backward and upward from the top surface of the ice maker 12. That is, the connection passage 23 can be configured to connect the ice maker 12 to the dispenser 20.

In some examples, a lower surface of the connection passage 23 can provide an ice outlet 231, and the ice outlet 231 can be disposed above the lighting assembly mounting portion 217, that is, a top surface of the recessed portion 211. The ice outlet 231 can communicate with the ice chute 24. Thus, the ice moving along the connection passage 23 can be discharged through the ice chute 24 from the inside of the recessed space 210.

The top surface of the recessed portion 211 on which the connection passage 23 is provided can be inclined, and a shutter 26 that opens and closes the connection passage 23 can be provided on the top surface of the recessed portion 211. An upper end of the shutter 26 can be rotatably coupled with a shaft and can be opened only when the dispenser 20 operates to dispense the ice so that the ice is discharged through the connection passage 23. In some cases, the shutter 26 (see FIG. 19) can be maintained in the closed state except for the operation of discharging the ice to prevent cold air from leaking.

Hereinafter, a structure of the touch assembly 30 will be described in more detail with reference to the accompanying drawings.

Figure 5:
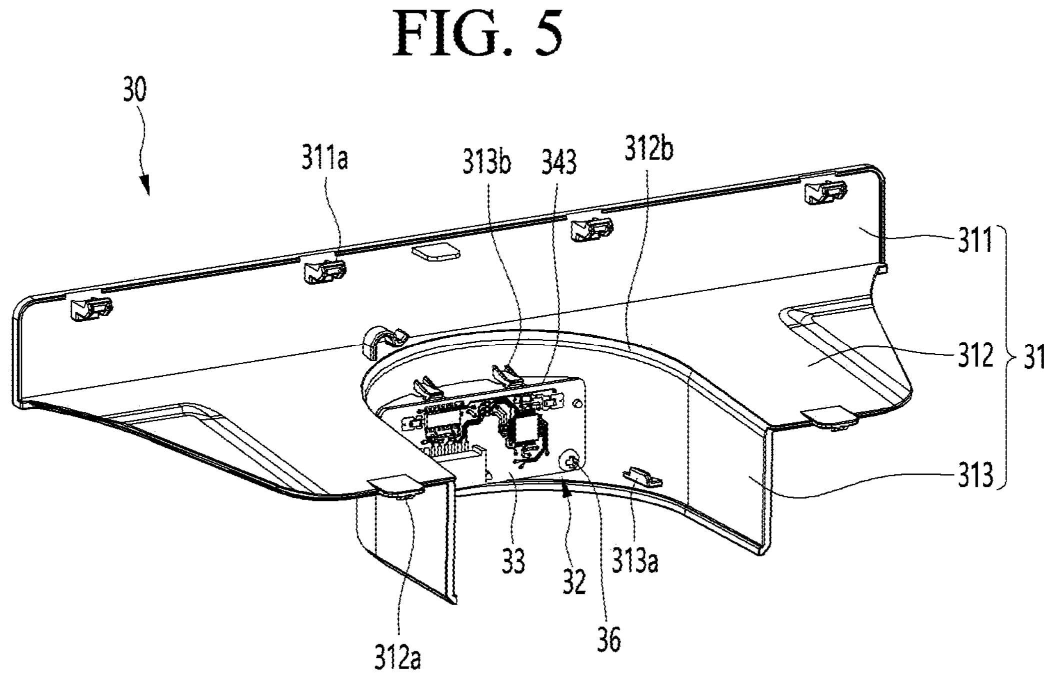
FIG. 5 is a rear perspective view illustrating an example state of a touch assembly that is one component of the dispenser.
Figure 6:
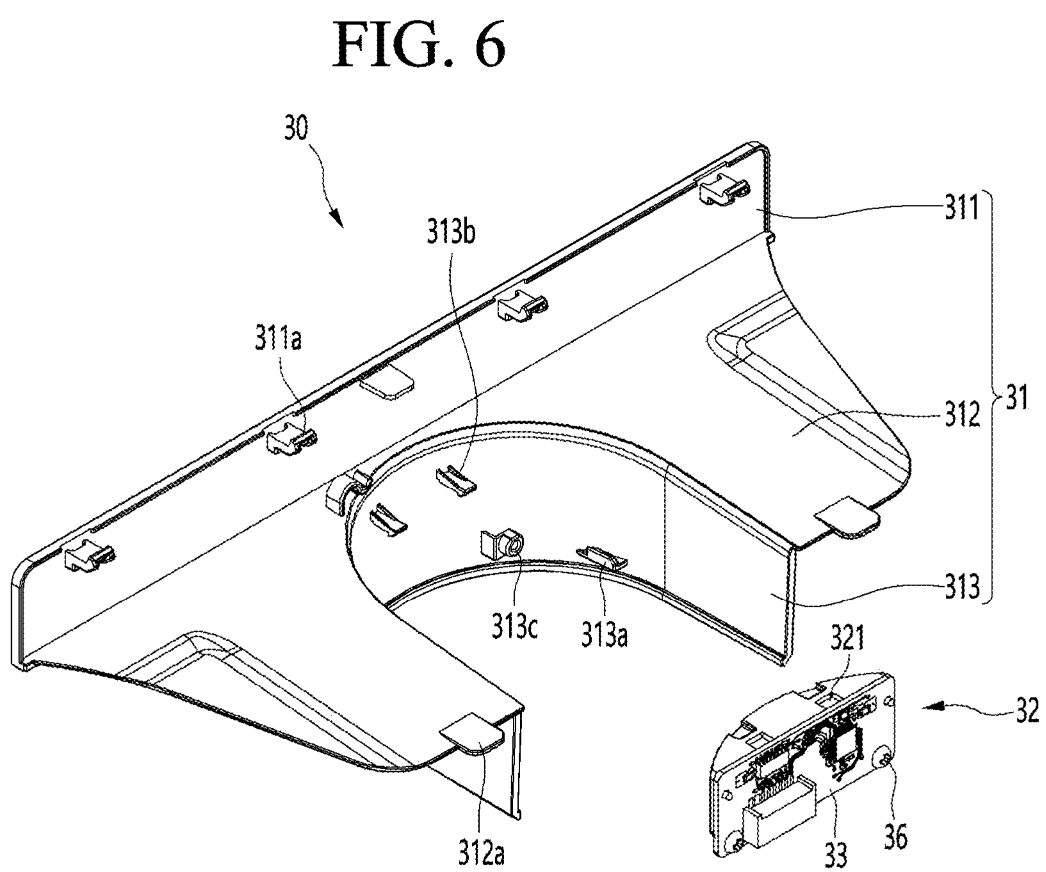
FIG. 6 is a rear exploded perspective view illustrating an example state of the touch assembly that is one component of the dispenser.
Figure 7:
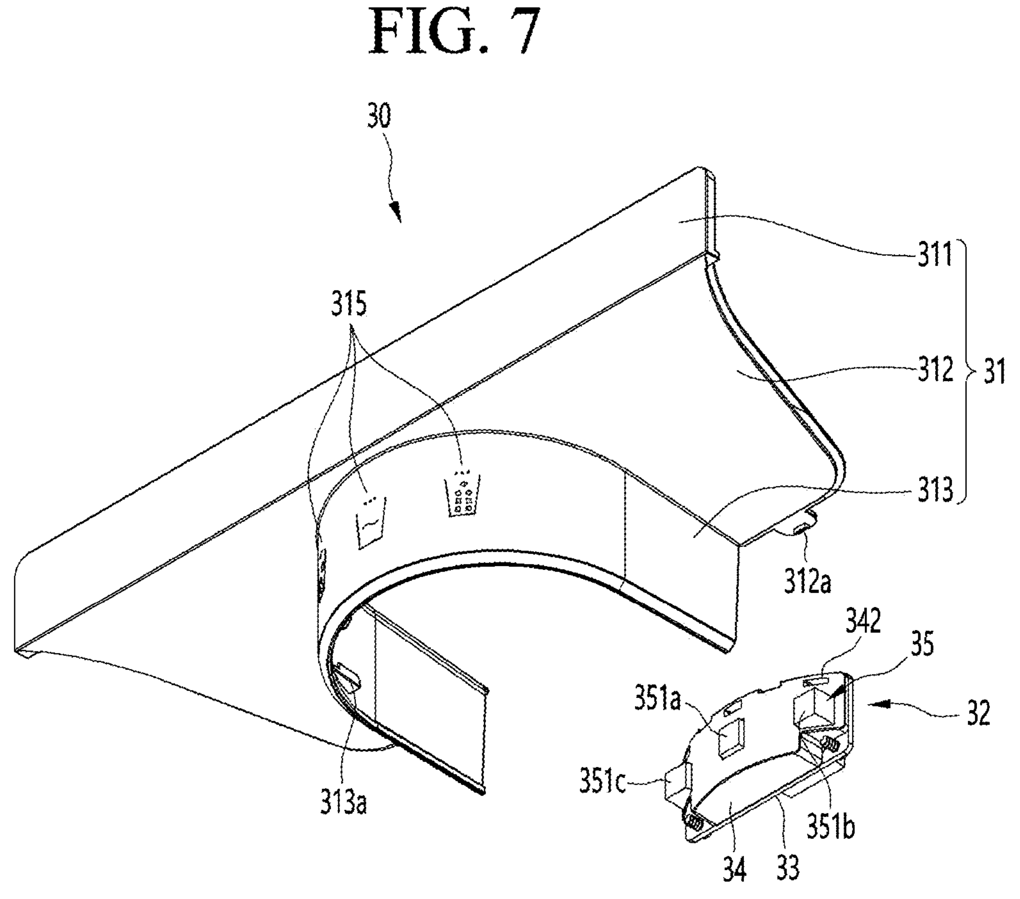
FIG. 7 is a front exploded perspective view illustrating an example state of the touch assembly.
Figure 8:
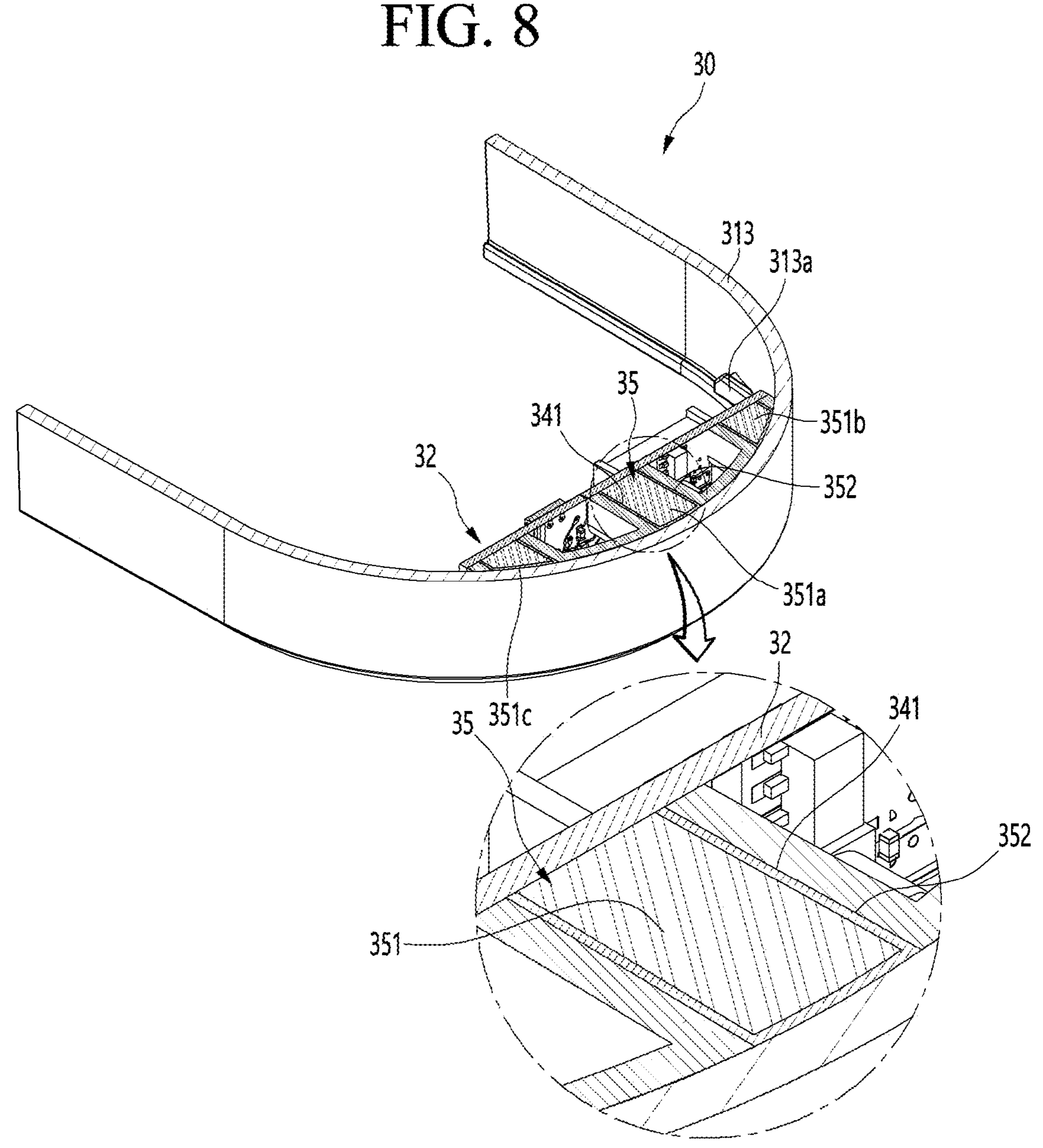
FIG. 8 is a cross-sectional view taken along line VIII-VIII' of FIG. 3.
Figure 9:
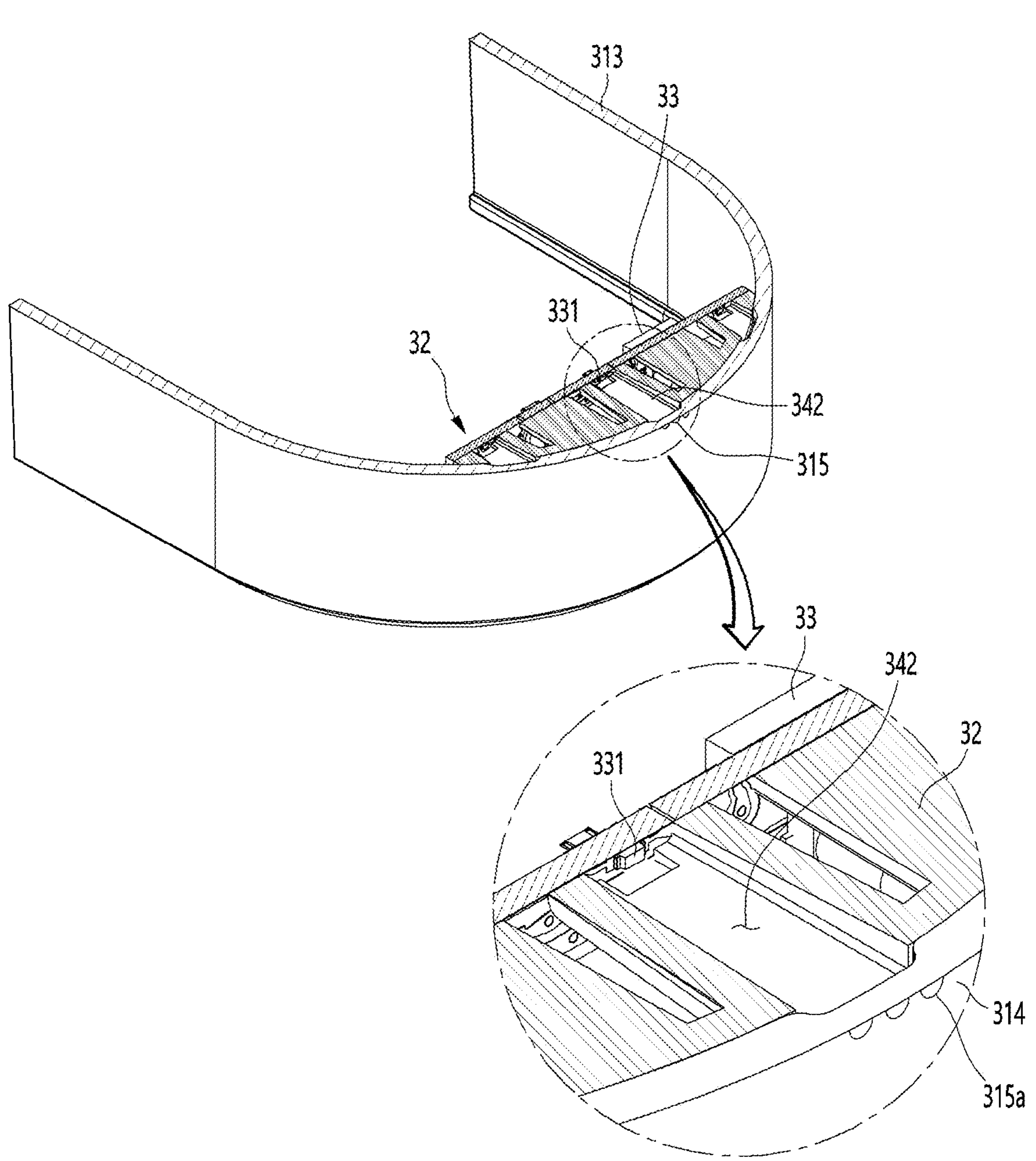
FIG. 9 is a cross-sectional view taken along line IX-IX' of FIG. 3.
Figure 10:
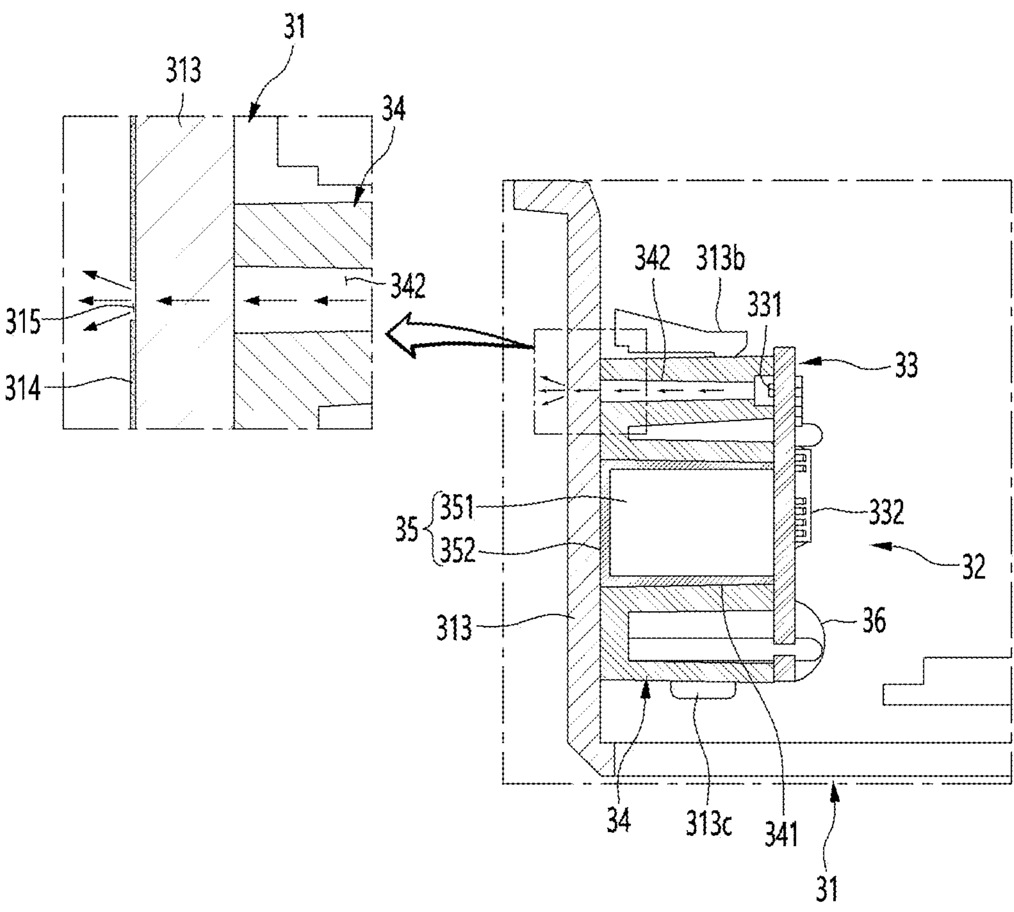
FIG. 10 is a cross-sectional view taken along line X-X' of FIG. 4.

FIG. 5 is a rear perspective view illustrating an example state of the touch assembly that is one component of the dispenser. Also, FIG. 6 is a rear exploded perspective view illustrating an example state of the touch assembly that is one component of the dispenser. Also, FIG. 7 is a front exploded perspective view illustrating an example state of the touch assembly. Also, FIG. 8 is a cross-sectional view taken along line VIII-VIII' of FIG. 3. Also, FIG. 9 is a cross-sectional view taken along line IX-IX' of FIG. 3. Also, FIG. 10 is a cross-sectional view taken along line X-X' of FIG. 4.

In some implementations, the touch assembly 30 includes a touch case 31 defining an overall appearance thereof, and a touch device 32 provided inside the touch case 31 to recognize the user's selected operation.

The touch case 31 can be provided to define a portion of an outer appearance of an upper end of the dispenser 20 and the dispensing portion 27 for the user's touch operation. The touch case 31 can be injection-molded using a plastic material to implement a complex outer appearance and a mounting structure. Since the touch case 31 defines an upper portion of the dispensing portion 27, the touch case 31 can be referred to as an upper case.

In some examples, the touch case 31 can include a front portion 311, a bottom portion 312, and a manipulation portion 313. In some cases, the touch case 31 can be configured by combining the manipulation portion 313 with other components.

In detail, the front portion 311 can define an upper end of the front surface of the dispenser 20 and an upper end of the recessed space 210. In some examples, a plurality of front coupling protrusions 311*a* can be disposed along a circumference of the front portion 311. Each of the front coupling protrusions 311*a* can be provided in a hook-like shape to be coupled to the dispenser case 21.

The bottom portion 312 extending backward can be disposed at a lower end of the front portion 311. The bottom portion 312 can extend from a lower end of the front portion 311 to the rear surface of the recessed portion 211 and divide the inside of the dispenser case 21 to define the top surface of the recessed space 210. In some cases, a bottom portion coupling protrusion 312*a* extending backward can be disposed at the rear end of the bottom portion 312 and be coupled to an inner surface of the dispenser case 21.

An opening 312*b* can be defined in a center of the bottom portion 312 to dispose the ice chute 24, and the manipulation portion 313 can be provided extending downward along the circumference of the opening 312*b*. The manipulation portion 313 can be provided to surround the ice chute 24 from the front and can define the upper portion of the dispensing portion 27.

The manipulation portion 313 can extend downward to a length that is sufficient to provide the touch portion 316 and the display 315. In some cases, an outer surface of the manipulation portion 313 can be provided in a curved shape and a rounded shape so that a center thereof protrudes gradually backward toward both sides. The manipulation portion 313 can extend downward, and a lower end of the manipulation portion 313 can extend to the lighting assembly 40.

The manipulation portion 313 can include the touch portion 316 and the display 315. The touch portion 316 can be configured by printing or surface processing on the surface of the manipulation portion 313. In some cases, the touch portion 316 can be provided at a position corresponding to a sensing member 35 of the touch device 32. Thus, when the user operates the touch portion 316, the sensing member 35 can recognize the user's touch operation.

The display 315 can be disposed above the touch portion 316 and can be provided at a position corresponding to the position of the light emitting member 331 provided in the touch device 32. The display 315 is configured to allow light to pass through, and therefore, when the light emitting member 331 is turned on, light irradiated from the light emitting member 331 may be transmitted to display the user's touch operation or operation state.

The display 315 can be configured to allow the light to pass therethrough. In some examples, the touch case 31 can be made of a plastic material that is capable of transmitting light. In some cases, a blocking layer 314 that blocks light transmission can be provided on a remaining area except for the display 315. The blocking layer 314 can be provided in various forms such as coating, painting or film attachment, printing, and the like.

For example, the blocking layer 314 can be disposed at an entire surface of the touch case 31 through which light is transmitted, and the blocking layer 314 can be removed through laser processing or the like so that the light is transmittable through the display 315. In some cases, the display 315 can be provided in a hole shape. In some cases, the display 315 may be provided in a plurality of hole shapes per each touch portion 316. In some examples, the display 315 can be provided in a plurality of hole shapes, can be provided in any shape, or can be provided in a specific shape as necessary.

In detail, after injection-molding the touch case 31 using the plastic material that is capable of transmitting light, a surface of the touch case 31 may be coated, painted, film-attached, printed, or sprayed to provide the blocking layer 314 that blocks the light transmission.

In some examples, the blocking layer 314 can be disposed at the entire surface of the touch case 31 through which light is transmitted, and the area of the touch case 31, on which the blocking layer 314 is disposed can be irradiated from the light emitting member 331.

After providing the blocking layer 314, the display 315 can be formed by removing the blocking layer 314 through laser processing, and the like so that the removed portion is transparent. In some cases, when the light emitting member 331 is turned on, the light emitted from the light emitting member 331 can be guided to the rear surface of the display 315 to illuminate the display 315. In some cases, the user can check the operation state of the dispenser 20 through the display 315.

In some examples, the display 315 can include at least one or more micro-holes 315*a* by the laser processing.

In some examples, when the display 315 includes a plurality of micro-holes, a distance between the adjacent micro-holes can be larger than a diameter d2 of each of the micro-holes. In some examples, a plurality of the micro-holes 315*a* are provided and the micro-holes 315*a* can overlap between the adjacent micro-holes 315*a* by diffusion of light passing through the micro-holes 315*a*. For example, in this disclosure, an interval between the adjacent micro-holes can be larger than the diameter of each of the micro-holes so that the light passing through each of the micro-holes 315*a* can be recognized more clearly. For example, a diameter d2 of each of the micro-holes can be about 0.3 mm to about 0.7 mm, and an interval between adjacent micro-holes can be about 1 mm to about 1.5 mm.

The blocking layer 314 can be provided to have the same or similar texture to the outer plate 11. For example, the blocking layer 314 can be provided in the same or similar color as the outer plate 11 so as to have a sense of unity with the outer plate 11 made of a metal material, and thus, the touch case 31 can provide an outer appearance that is more integrated with the door 10.

The degree of removal of the blocking layer 314 can be adjusted according to an output of the laser. In some cases, when the light emitting member 331 is turned off, the display 315 may not be well exposed to the outside, and the display 315 can be clearly identified from the outside only when the light emitting member 331 is turned on.

In some examples, the display 315 can be integrated with the touch portion 316. In some cases, when the display 315 is provided on the area of the touch portion 316 to have the same shape as the touch portion 316, and the light emitting member 331 is turned on, the shape of the touch portion 316 may be identified clearly.

In some examples, a case coupling protrusion 313*a* coupled to the lighting assembly 40 can be provided on the rear surface of the manipulation portion 313. The case coupling protrusion 313*a* can be provided at each of positions facing each other on both left and right surfaces. In some cases, the case coupling protrusion 313*a* can be disposed at a position at which a curved front surface and both straight side surfaces of the manipulation portion 313 are in contact with each other. The case coupling protrusions 313*a* can protrude in opposite directions and can be provided to be restricted in a body restriction groove 412*b* to be described below.

In some examples, a mounting portion hook 313*b* for mounting the touch device 32 can be disposed at the rear surface of the manipulation portion 313. The mounting portion hook 313*b* can be coupled to a restriction groove 321 defined in an upper end of the touch device 32 to restrict the touch device 32. In some cases, a screw coupling portion to which a screw 36 for mounting the touch device 32 is coupled can be further provided on the rear surface of the manipulation portion 313. The screw 36 can pass through both left and right sides of the lower end of the touch device 32 so as to be coupled to the screw coupling portion. Thus, the touch device 32 can be fixed in a state of being in close contact with the rear surface of the manipulation portion 313 having a curved shape.

The touch device 32 can be configured to recognize the operation of the touch portion 316 and transmit light through the display 315 so as to display the operation state. The touch device 32 can include a touch substrate 33, on which a touch sensor 332 and the light emitting member 331 are mounted, and a guide member 34 mounted on a front surface of the touch substrate 33.

In detail, the touch substrate 33 can define a rear surface of the touch device 32, and the sensing member 35 can be mounted thereon. The sensing member 35 can be disposed at a position corresponding to the touch portion 316. In some implementations, in this disclosure, three sensing members 35 are provided as an example, but the number of sensing members 35 can be determined according to the configuration of the touch portion 316.

The sensing member 35 can include a touch sensor 332, an elastic member 351, and a transfer member 352. The touch sensor 332 can be provided as a capacitive touch sensor 332 and can be configured to detect a change in static electricity when the user touches the touch portion 316. In some cases, the touch sensor 332 can be provided on the touch substrate 33 and can be electrically connected to the transfer member 352. In some examples, the touch sensor 332 can be provided on a rear surface of the diffuser touch substrate 33. Thus, even if the user operates the touch portion 316 disposed at the manipulation portion 313 provided in the curved shape, the elastic member 351 and the transfer member 352 can effectively detect the touch operation.

In detail, an elastic member 351 can be disposed in front of the touch sensor 332. The elastic member 351 can be made of an elastically deformable material such as sponge and can be provided in a block shape. In some cases, the elastic member 351 can protrude further than a distance from the touch substrate 33 up to the manipulation portion 313. Thus, when the touch device 32 is mounted, the elastic member 351 can be in close contact with the rear surface of the manipulation portion 313 provided in a curved shape.

In detail, a plurality of elastic members 351 can be provided on the front surface of the touch device 32. The elastic member 351 can be mounted on the touch substrate 33, pass through the opening 32*a* defined in the front surface of the touch device 32, and be in contact with the rear surface of the manipulation portion 313.

In some examples, the elastic member 351 can be fixed to the front surface of the touch substrate 33 by soldering or the like and may extend so as to be in contact with the rear surface of the manipulation portion 313. In some cases, an edge portion that is in contact with the touch substrate 33 and the elastic member 351 can be fixed through a soldering operation.

The elastic member 351 can include a first elastic member 351*a* disposed at a center of the manipulation portion 313 and a pair of second elastic members 351*b* disposed on both left and right sides of the first elastic member 351*a*, respectively.

In some examples, a first touch sensor and a second touch sensor can be installed on the touch substrate 33 at positions corresponding to the first and second elastic members 351*a* and 351*b*, respectively.

The first elastic member 351*a* can be provided on a rear surface of the manipulation portion 313 that protrudes forward. In some cases, the touch device 32 can have a shape corresponding to that of the rear surface of the manipulation portion 313 and can be mounted on the most forward portion of the touch device 32.

In some examples, a front surface of the first elastic member 351*a* can correspond to a shape of a central portion of the rear surface of the manipulation portion 313 so as to be in close contact with the rear surface of the manipulation portion 313. In some cases, the front surface of the first elastic member 351*a* can have the same height on both left and right sides protruding forward from the opening 32*a*.

The second elastic member 351*b* can be provided to be spaced a predetermined distance apart from each other at left and right sides with respect to the first elastic member 351*a*. A position at which the second elastic member 351*b* is provided can be spaced apart from the center of the front surface of the touch device 32 to both sides.

The front surface of the second elastic member 351*b* can further include an inclined portion 351*c* to be in close contact with the rear surface of the manipulation portion 313.

In detail, the manipulation portion 313 can have a shape that is rounded backward toward both sides from the center. If the front surface of the second elastic member 351*b* has the same length as the left and right side of the first elastic member 351*a*, the entire front surface of the second elastic member 351*b* may not be in close contact with the rear surface of the manipulation portion 313 by the rounded portion of the manipulation portion 313. In some examples, the entire surface of the manipulation portion 313 may not be in close contact with the rear surface. In some implementations, touch sensitivity can vary according to the position touched by the user.

In some examples, the second elastic member 351*b* can have the inclined portion 351*c* that is inclined to further protrude forward in a direction away from the first elastic member 351*a*. In some cases, a pressure pushed by the rear surface of the manipulation portion 313 can increase in a direction away from the first elastic member 351*a*, i.e., in an outward direction. In some cases, it is possible to secure a uniform contact surface on the rear surface of the manipulation portion 313, and even if the user touches the manipulation portion 313 corresponding to the second elastic member 351*b* in a direction slightly off-center, the user's touch can be detected, and reliability can be improved.

In some implementations, a length of the first elastic member 351*a*, which protrudes forward from the opening 32*a* of the touch device 32, can be about 1 mm to 4 mm, preferably about 1 mm to 3 mm. In some cases, a length of the overlapping portion of the first elastic member 351*a* and the second elastic member, is at least 2 mm or more.

In some examples, a transfer member 352 can be provided on an outer surface of the elastic member 351. The transfer member 352 can be made of a material capable of transferring static electricity on the surface of the manipulation portion 313 to the touch sensor 332. In some cases, the transfer member 352 can be provided to surround the outer surface of the elastic member 351 and can be made of a material that is capable of being deformed together when the elastic member 351 is deformed. In some cases, the transfer member 352 can be made of a thin metal thin film or a conductive film material and can be provided to have a flexible structure.

The transfer member 352 can be disposed along the elastic member 351, and an end of the transfer member 352 can be connected to the touch substrate 33. In some cases, the rear surface of the manipulation portion 313 and the touch sensor 332 of the touch substrate 33 can be electrically connected to each other. For example, the transfer member 352 can be disposed to be connected along the front surface and both left and right surfaces of the elastic member 351, and a rear surface of the elastic member 351 can be mounted on the touch substrate 33 by welding or the like.

The touch substrate 33 can further include a light emitting member 331. The light emitting member 331 can be disposed above each of the sensing members 35. In addition, the light emitting member 331 can be configured so that the corresponding light emitting member 331 is turned on when the user's touch is sensed by the sensing member 35. The light emitting member 331 can be provided as, for example, an LED.

The guide member 34 can be provided on the front surface of the touch substrate 33. The guide member 34 can define a front surface of the touch device 32 and can be configured to be disposed in a space between the touch substrate 33 and the rear surface of the manipulation portion 313 in a state in which the touch device 32 is mounted.

In some examples, the guide member 34 can guide the light irradiated from the light emitting member 331 to the display 315. In addition, the guide member 34 can guide the sensing member 35 to be maintained in a mounted state at an accurate position.

In detail, a front surface of the guide member 34 can be provided in a curved shape corresponding to the rear surface of the manipulation portion 313, and when the touch device 32 is mounted, the front surface of the guide member 34 can be completely in close contact with the rear surface of the manipulation portion 313. In some cases, a circumference of the guide member 34 can extend backward and can be mounted on the front surface of the touch substrate 33.

In addition, a hook coupling portion 343 to which the mounting portion hook 313*b* is coupled can be disposed on a top surface of the guide member 34. In some cases, the screw 36 can pass through the lower end of the touch substrate 33, and the screw 36 can be coupled to the screw coupling portion so that the touch device 32 is fixed and mounted in a state of being in close contact with the rear surface of the manipulation part 313. In some cases, it can be fixed and installed in a fixed state.

A guide hole 341 can be defined in the guide member 34. The guide hole 341 can be formed at a position corresponding to the touch portion 316 and the sensing member 35 and can define a space in which the sensing member 35 is accommodated. In addition, the guide hole 341 can have a cross-sectional shape corresponding to the sensing member 35, and even if the elastic member 351 is elastically deformed, the sensing member 35 can be prevented from being deviated from the arrangement position or abnormally deformed.

In some examples, the sensing member 35 can protrude further forward than the opened front surface of the guide hole 341 in a state in which the sensing member 35 is mounted on the touch substrate 33, and when the touch device 32 is mounted, the front surface of the sensing member 35 can be deformed to be in contact with the rear surface of the manipulation portion 313. In some cases, the sensing member 35 can be disposed in the guide hole 341 to maintain a position at which the manipulation of the touch portion 316 is accurately detected.

In addition, a light hole 342 can be defined above the guide hole 341. The light hole 342 can be configured to guide the light emitted from the light emitting member 331 to the display without leaking to the outside, and the light hole 342 can extend from the front surface of the touch substrate 33 to the rear surface of the manipulation portion 313. In some cases, the light emitting member 331 can be disposed inside the guide hole 341. The light hole 342 can provide a passage through which light is irradiated between the display 315 and the light emitting member 331.

Figure 11:
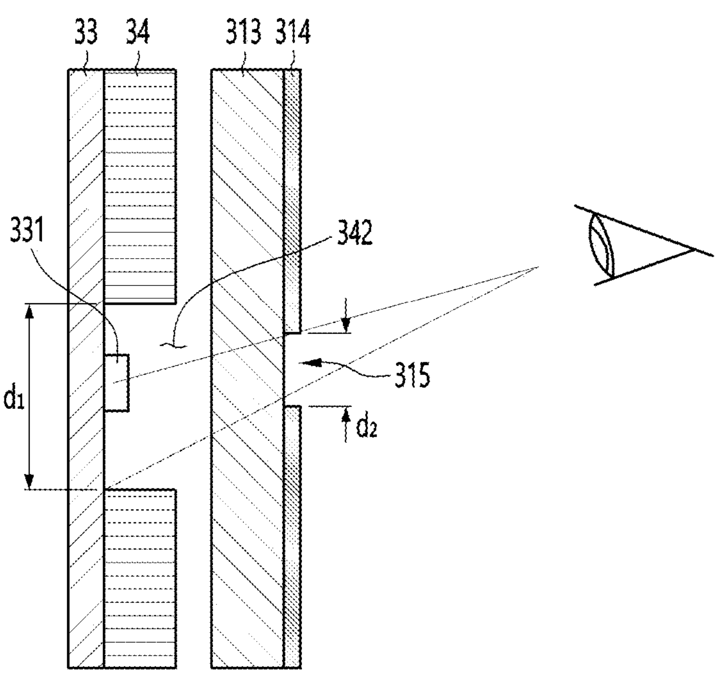
FIG. 11 is a schematic view illustrating an example viewing angle of a user when the user sees the touch assembly at the front.

FIG. 11 is a schematic view illustrating an example viewing angle of the user when the user sees the touch assembly at the front.

In some implementations, a vertical length d1 of the light hole 342 can be greater than a vertical length d2 of the display 315.

In some examples, a center line of the display 315 can be defined at a position corresponding to an upper end of the light hole 342. That is, the display 315 can be disposed at a position closer to the upper end of the light hole 342 than the lower end. In In some cases, a length between the upper end of the display 315 and the upper end of the light hole 342 can be less than a length between the lower end of the display 315 and the lower end of the light hole 342.

In some examples, when the user stands in front of the refrigerator and looks at the display 315, a height of the user's eyes can be higher than the display 315. If the user looks at the display 315, and a viewing angle is lower than the light emitting member 331, the light passing through the display 315 may not be properly recognized.

In some examples, when the display 315 is disposed close to a position corresponding to the upper end of the light hole 342, the viewing angle of the user looking at the upper side can be disposed between the light emitting member 331 and the lower end of the light hole 342. In this case, the user's viewing angle may not be disposed below the light hole 342, and thus, the entire light passing through the display 315 may be recognized. Thus, the user can easily recognize the light passing through the display 315 on the touch assembly 30 provided as the curved surface.

In some examples, with this structure, when the user touches the touch portion 316, the sensing member 35 can detect the user's touch, and the light emitting member 331 corresponding to the sensing member 35 can be turned on to irradiate light to the display 315, thereby illuminating the display 315. In addition, the user can check the operation state of the dispenser 20 through the display 315.

Hereinafter, the light assembly 40 and constituents adjacent to the light assembly 40 will be described in more detail with reference to the drawings.

Figure 12:
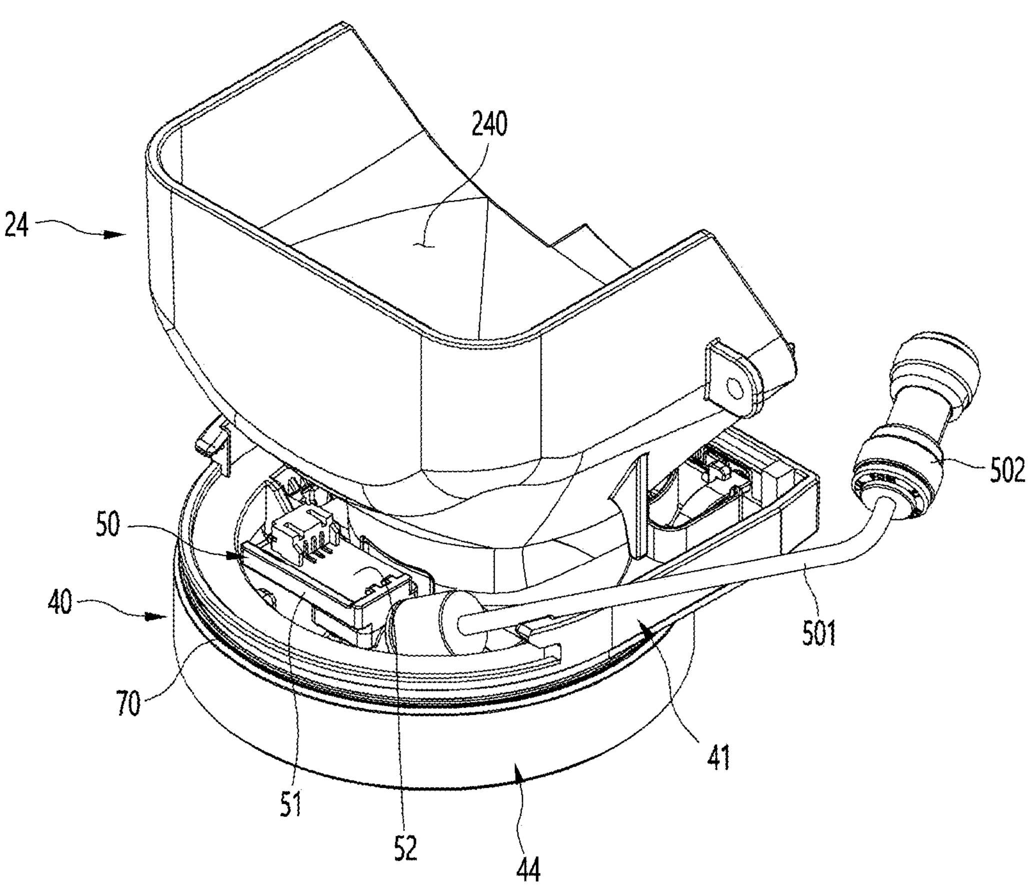
FIG. 12 is a perspective view illustrating an example state in which a lighting assembly, which is one component of the dispenser, the ice chute, and a nozzle assembly are coupled to each other.
Figure 13:
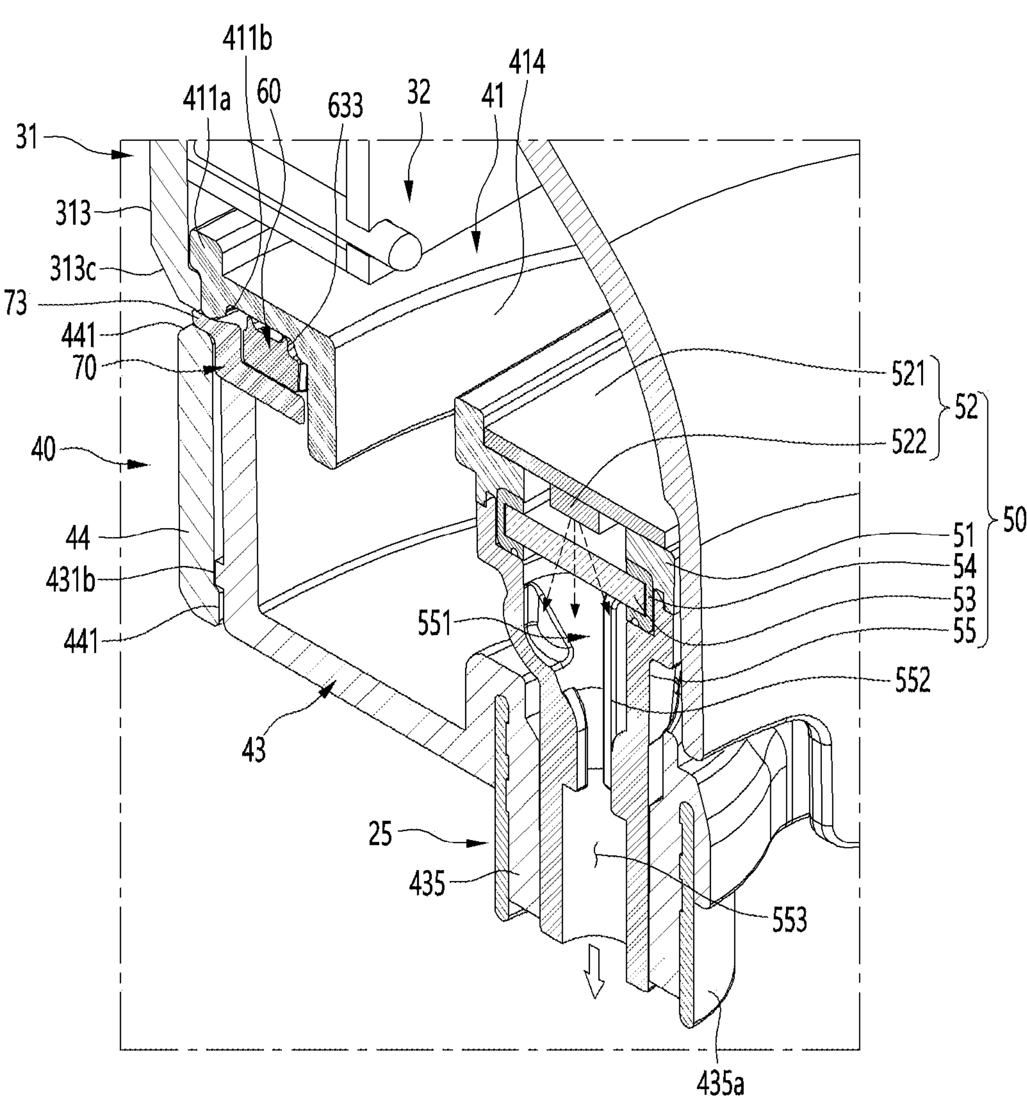
FIG. 13 is a cross-sectional view taken along line XIII-XIII' of FIG. 3.
Figure 14:
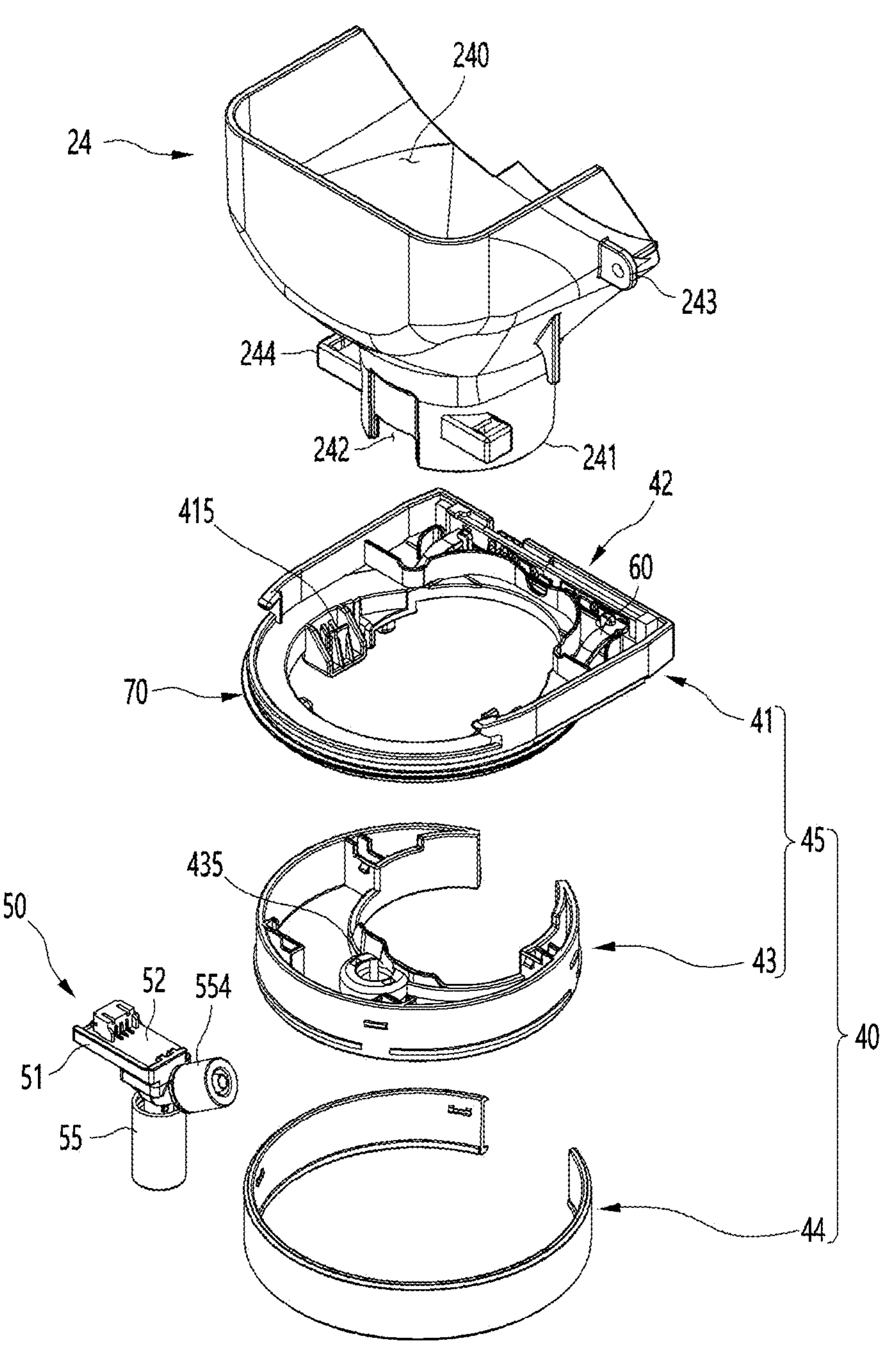
FIG. 14 is an exploded perspective view illustrating an example state of the lighting assembly, the ice chute, and the nozzle assembly.
Figure 15:
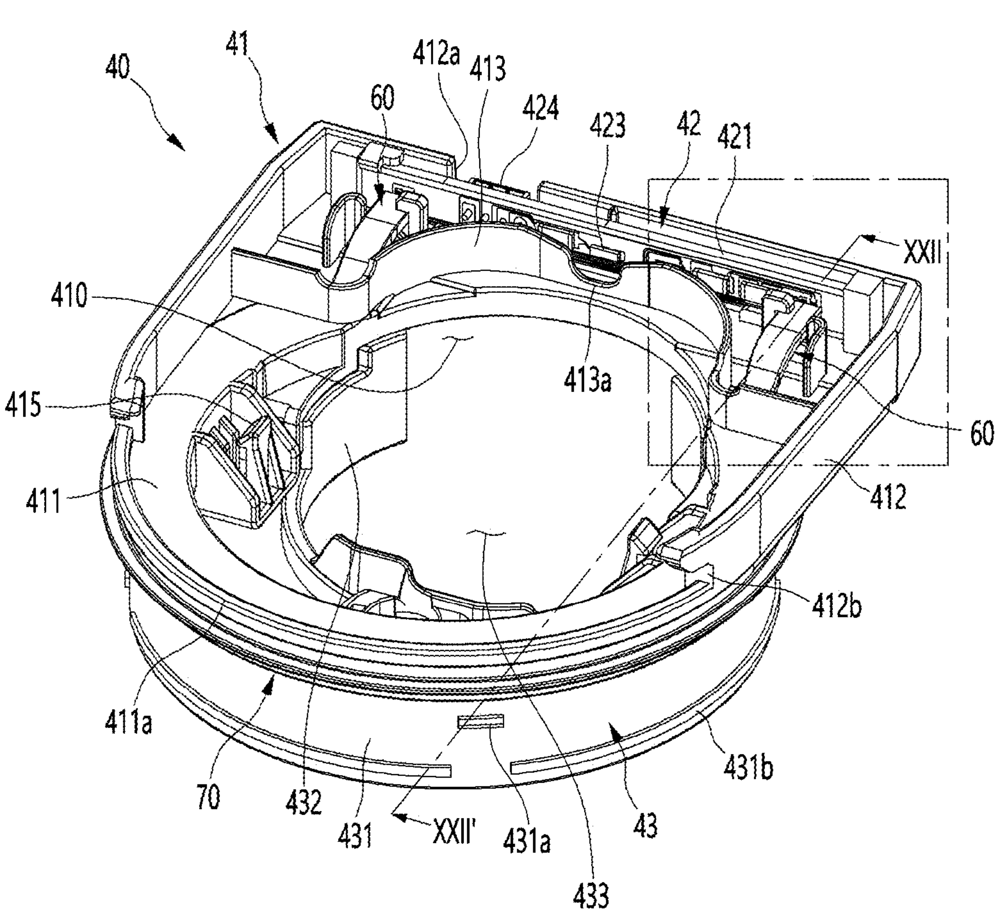
FIG. 15 is a perspective view illustrating an example of the lighting assembly.
Figure 16:
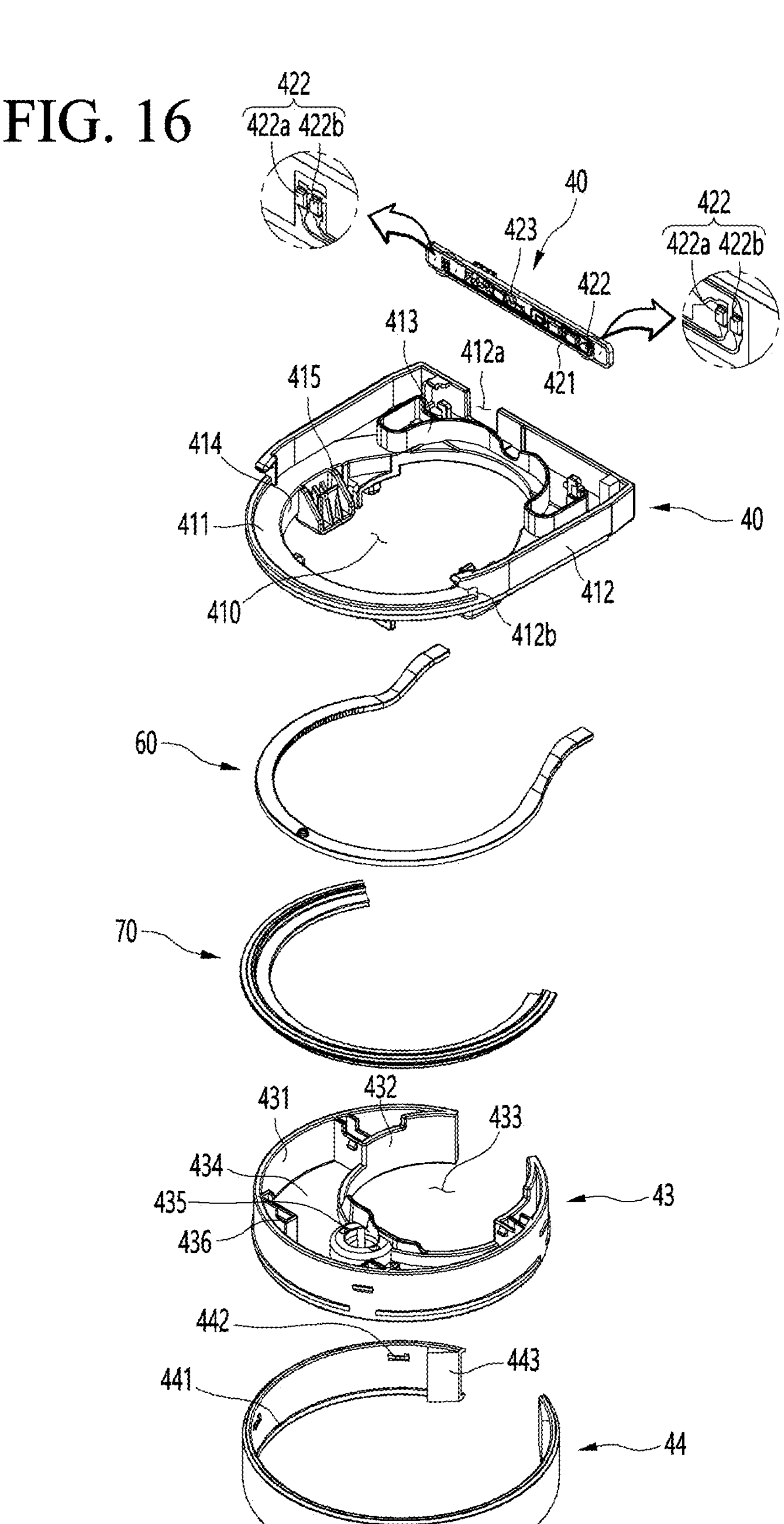
FIG. 16 is a front exploded perspective view illustrating an example state in which the lighting assembly is disassembled.
Figure 17:
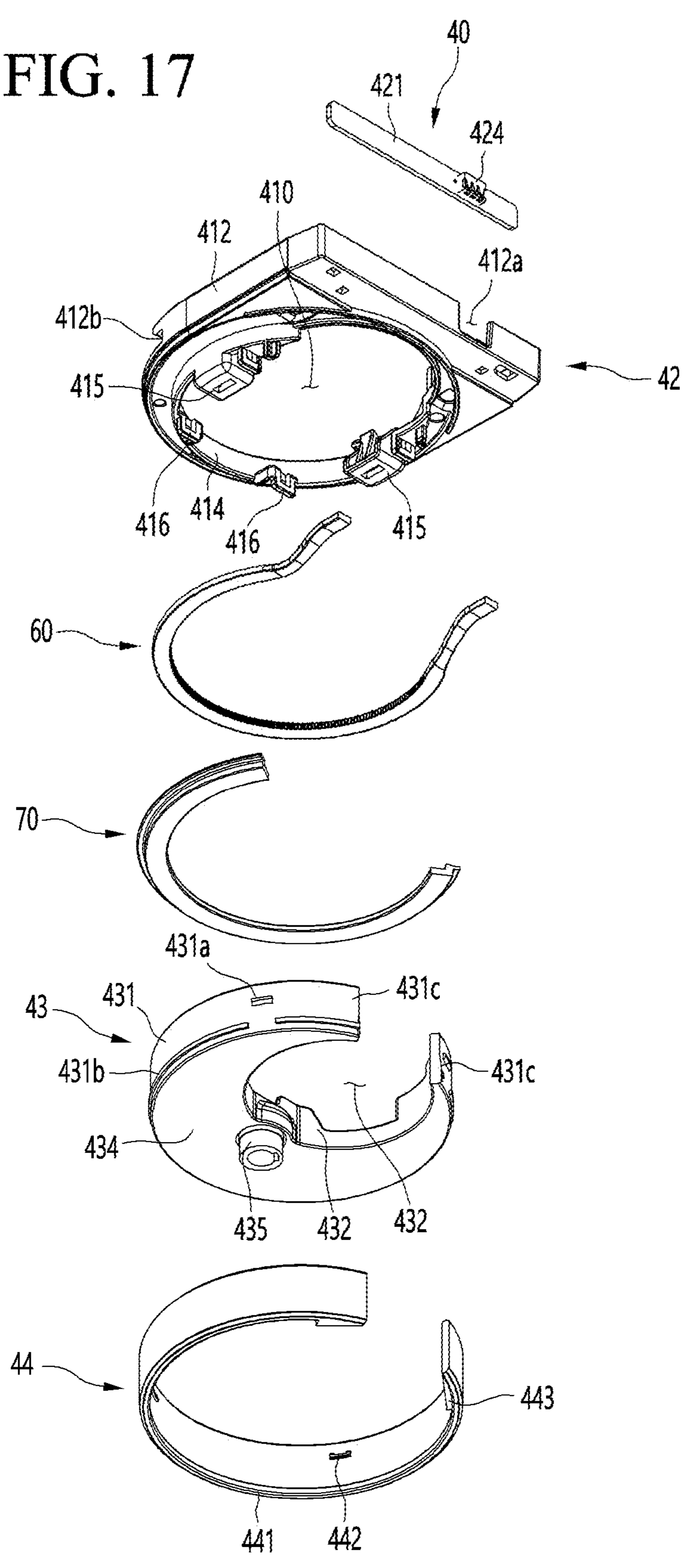
FIG. 17 is a bottom exploded perspective view illustrating the example state in which the lighting assembly is disassembled.

FIG. 12 is a perspective view illustrating an example state in which a lighting assembly, which is one component of the dispenser, the ice chute, and a nozzle assembly are coupled to each other. Also, FIG. 13 is a cross-sectional view taken along line XIII-XIII' of FIG. 3. Also, FIG. 14 is an exploded perspective view illustrating an example state of the lighting assembly, the ice chute, and the nozzle assembly. Also, FIG. 15 is a perspective view illustrating an example state of the lighting assembly. Also, FIG. 16 is a front exploded perspective view illustrating an example state in which the lighting assembly is disassembled. Also, FIG. 17 is a bottom exploded perspective view illustrating an example state in which the lighting assembly is disassembled.

In some implementations, the lighting assembly 40 can be provided in a ring shape, and a rear end of the lighting assembly 40 can be mounted on the dispenser case 21. In addition, the ice chute 24 and the nozzle 55 can be mounted on the lighting assembly 40.

The ice chute 24 can be provided in a vertically opened shape, and a space 240, through which ice discharged through the connection passage 23 passes, can be defined therein. In some cases, the opened upper end of the ice chute 24 can be opened toward the connection passage 23 and have a diameter greater than that of the end of the connection passage 23. In some cases, an upper portion of the ice chute 24 disposed above the lighting assembly 40 can have a diameter greater than that of a lower portion of the ice chute 24.

An upper fixing portion 243 protruding laterally and fixed to the inner surface of the dispenser case 21 can be disposed on each of both left and right surfaces of the upper portion of the ice chute 24. In some cases, a lower fixing portion 244 protruding laterally and fixed to both sides of the lighting assembly 40 can be disposed on each of left and right surfaces of the lower portion of the ice chute 24. The ice chute 24 can be maintained at a mounting position in the dispenser 20 by the upper fixing portion 243 and the lower fixing portion 244.

The lower portion of the ice chute 24 can extend through the lighting assembly 40 and can extend further downward than the lower end of the lighting assembly 40. In addition, a chute outlet 241 at the lower end of the ice chute 24 can face downward, and the lower end of the ice chute 24 can be exposed below the lighting assembly 40.

The lighting assembly 40 can be made of a material capable of being transparent or transmissive and can be made of a material capable of diffusing light. Therefore, when a chute light emitting member 331, which will be described below, is turned on, the ice chute 24 itself can be illuminated. That is, at least the lower end of the ice chute 24 exposed downwards of the lighting assembly 40 can be illuminated, and thus, the user can visualize and indicate the operation state of the dispenser 20.

In some examples, a chute groove 242 can be defined at a lower end of a front surface of the ice chute 24. The chute groove 242 can be provided in the form of a groove recessed upward from the lower end and can be provided to accommodate a portion of the water outlet 25 of the lighting mounting portion on which the nozzle 55 is mounted.

In some cases, at least a portion of the lower end of the ice chute 24 and the lower end of the water outlet 25 can overlap each other, and thus, the cup or container of the dispenser 20 can accommodate the water and ice in a state of being at the same position or not largely moved.

The nozzle assembly 50 can be mounted in front of the ice chute 24.

In some examples, the nozzle assembly 50 can be configured to allow purified water to be dispensed and can be mounted inside the lighting assembly 40 and be inserted and mounted inside the nozzle insertion portion 435 formed in the lighting assembly 40.

In some examples, the nozzle assembly 50 can include a nozzle 55 from which purified water is discharged, a sterilization device 52 provided in the nozzle 55 to sterilize water passing through the nozzle 55, a tube 501 connected to the nozzle 55, and a fitting 502.

In some cases, an inlet 551 through which purified water can be introduced can be provided at an upper portion of the nozzle 55. The inlet 551 can communicate with a tube connection portion 554 disposed at an upper end of the nozzle 55. The tube 501 through which purified water flows can be connected to the tube connection portion 554. Accordingly, water introduced through the tube connection portion 554 can be supplied to the inlet 551.

In addition, the inlet 551 can have an open top surface, and the sterilization device 52 can be disposed at the opened top surface of the inlet 551. The sterilization device 52 can be configured to sterilize the inside of the nozzle 55 by irradiating ultraviolet rays to the inside of the nozzle 55.

The sterilization device 52 can include a sterilization substrate 521 on which a sterilization LED 522 irradiating ultraviolet rays is mounted. In some cases, the sterilization device 52 can be mounted to a sterilization case 51 mounted on an upper end of the nozzle 55. The sterilization case 51 can be coupled to an upper end of the inlet 551, and the opened top surface of the inlet 551 can be shielded by the sterilization case 51 and the sterilization substrate 521. In a state in which the sterilization substrate 521 is mounted, the sterilization LED 522 can be disposed to face the inside of the inlet 551. In some cases, the sterilization LED 522 can be disposed on the same extension line as the water outlet passage 553 inside the nozzle 55 to sterilize the inlet 551 as well as the water outlet passage 553 through which water flows.

The sterilization device 52 can include a light transmission cover 53. The light transmission cover 53 can be mounted to shield the opened top surface of the inlet 551 and can shield the sterilization LED 522 in the mounted state. Thus, the water of the inlet 551 can be blocked from flowing into the sterilization LED 522 or the sterilization substrate 521. In some examples, the light transmission cover 53 can be provided so that ultraviolet rays irradiated from the sterilization LED 522 are transmitted. For example, the light transmission cover 53 can be made of glass or a transparent acrylic material.

A sealer 54 can be further provided around the light transmission cover 53, and water can be prevented from leaking between the light transmission cover 53 and the nozzle 55 or the sterilization case 51 by the sealer 54.

The nozzle 55 can extend downward and be inserted into the nozzle insertion portion 435. The nozzle 55 can extend to a lower end of the nozzle insertion portion 435. In some cases, an outlet water passage 553 can be provided to pass from the lower end of the inlet 551 to the lower end of the nozzle 55. Thus, water of the inlet 551 can be discharged to the lower end of the nozzle 55 through the water outlet 553.

A guide rib 552 can be disposed inside the nozzle 55. The guide rib 552 can protrude from an inner surface of the inlet 551 toward a center and can pass through the inlet 551 to extend up to the inside of the outlet passage 553. The guide rib 552 can allow the water introduced from the side through the tube connection portion 554 to pass through the outlet passage 553 more effectively without being attached to an inner wall surface of the inlet 551. In some cases, a plurality of guide ribs 552 can be provided in a radial direction.

The lighting assembly 40 can include an upper body 41 and a lower body 43 to which the light guide 60 and the diffusion member 70 are mounted. The upper body 41 and the lower body 43 can be coupled to each other, and the upper body 41 and the lower body 43 can be referred to as a dispensing portion body 45. In some cases, the lower body 43 can be provided with a lower cover 44 forming an outer appearance thereof.

In some examples, the ice chute 24 can be mounted to the upper body 41. A body coupling portion 415 coupled to the lower fixing portion 244 of the ice chute 24 can be provided inside the upper body 41. The body coupling portion 415 can be provided in a shape such as a hook and may be hooked and restricted by the lower fixing portion 244.

In some examples, the nozzle assembly 50 can be mounted to the lower body 43. The nozzle inserting part 435 protruding downward can be provided on a bottom surface of the lower body 43, and the nozzle insertion portion 435 can be penetrated in the vertical direction so that the nozzle 55 is inserted. The nozzle insertion portion 435 can have a cylindrical shape and can extend up to a height corresponding to the lower end of the ice chute 24.

In addition, a nozzle decoration **235*a* can be provided on an outer surface of the nozzle insertion portion 435. The nozzle decoration 235*a* can be made of a metal material or a material having a metal texture and can be provided in a cylindrical shape so as to be inserted into the outer surface of the nozzle insertion portion 435**.

A portion which protrudes downward, from which water is dispensed, and which includes the nozzle insertion portion 435, the nozzle decoration **235*a*, and the nozzle 55 can be referred to as a water outlet 25. In some cases, the water outlet 25 can be configured only with at least one of the nozzle insertion portions 435 and the nozzle 55**.

The light guide 60, a lighting module 42 that irradiates light to the light guide 60, and a diffusion member 70 that diffuses the light of the light guide 60 so as to be seen to the outside can be mounted on the upper body 41.

In a state in which the touch assembly 30 and the lighting assembly 40 are mounted, an outer end of the light guide 60 can be exposed between the touch assembly 30 and the lighting assembly 40, and when an LED 422 of the lighting module is turned on, the diffusion member 70 can be illuminated in a ring shape from the outer surface of the water outlet 25. In some cases, the light guide 60 and the diffusion member 70 can be coupled to each other, and the light guide 60 and the diffusion member 70 can be referred to as a light ring.

Hereinafter, a structure of the lighting assembly will be described in more detail with reference to the accompanying drawings.

FIG. 11 is a perspective view illustrating an example state of the lighting assembly, FIG. 12 is a perspective view illustrating an example state in which the lighting assembly, which is one component of the dispenser, the ice chute, and the nozzle assembly are coupled to each other, and FIG. 13 is a cross-sectional view taken along line XIII-XIII' of FIG. 3.

In some implementations, the lighting assembly 40 can include the lighting module 42, the upper body 41, the lower body 43, and the light guide 60. In addition, the lighting assembly 40 can further include the diffusion member 70.

The lighting module 42 can include an LED 422 irradiating light to the light guide 60 and a light substrate 421 on which the LED 422 is mounted. The light substrate 421 can have a horizontal length greater than that of the light guide 60. In some cases, the LED 422 can be provided on each of both sides of the light substrate 421 to radiate light toward both rear ends of the light guide 60.

The LEDs 422 can be disposed to be symmetrical on both left and right sides with the light substrate 421 as the center and can be spaced apart from each other at the left and right sides based on the position of the nozzle 55.

In some examples, a plurality of the LEDs 422 can be provided at both left and right sides, respectively. In some examples, all of the plurality of LEDs 422 can be disposed between both ends of the rear end of the light guide 60. That is, a distance between the outer ends of the plurality of LEDs 422 can be less than a width of the rear end of the light guide 60. In some cases, the light irradiated from the plurality of LEDs 422 can be directed toward the rear end of the light guide 60 as a whole.

In addition, the plurality of LEDs 422 can have different colors. For example, the plurality of LEDs 422 can include a blue LED 422*a* and a white LED 422*b*. Thus, information to be displayed through the light emission of the ring light 730 can be displayed through the color of the LED 422. In some cases, the ring light 730 can emit light in different colors depending on the operation state of the dispenser 20 or the refrigerator 1.

Various elements or light emitting bodies capable of irradiating light can be used as the LED 422 and thus can be referred to as a light source or a light emitting member. In some examples, the LED 422 may not be provided as a plurality of light sources shining in each color but may be provided as a single component. In some examples, the light source provided as the single component can be configured to operate so as to emit light in a plurality of colors.

The light substrate 421 can further include a chute LED 423. The chute LED 423 can irradiate light toward the ice chute 24 and can be disposed between the light substrate 421 and the lighting assembly 40. The chute LED 423 can be disposed behind the nozzle 55 and can be disposed on the same extension line in the front and rear direction as the nozzle 55.

In some examples, when the chute LED 423 is turned on, light can be irradiated toward a middle portion of the outer surface of the ice chute 24. Thus, when the chute LED 423 is turned on, the lower end of the ice chute 24 exposed downward of the lighting assembly 40 can be brightly illuminated, and the operation of the dispenser 20 can be visualized to the user.

The upper body 41 can be entirely made of plastic injection molding and can have a structure in which the ice chute 24, the lighting module 42, and the light guide 60 are mounted.

The lighting module 42 can further include a lower cover 44. The lower cover 44 can be configured to define an outer appearance exposed to the outside of the lighting module 42 and can be mounted on an outer surface of the lower body 43.

In detail, the upper body 41 can include an upper base 411 defining a bottom surface and an upper opening 433 passing through a center of the upper base 411 so that the ice chute passes therethrough. In addition, a body coupling portion 415 can be provided on each of both left and right sides of the upper opening 410 and can have a coupling structure with the lower fixing portion 244 of the ice chute 24.

In some cases, an upper edge 412 can be disposed along an outer circumference of the upper base 411. In some cases, the upper edge 412 can extend upward. The upper edge 412 can define a space in which the lighting module 42 is mounted, while providing the coupling structure with the touch assembly 30.

The upper edge 412 can be disposed on each of both sides and a rear surface of the entire circumference of the upper base 411. The upper edge 412 can have a height equal to or greater than that of the upper end of the lighting module 42 so that the lighting module 42 provided therein does not interfere with other components. In addition, the upper edge 412 can have a height that allows the upper edge to be inserted into the lighting assembly mounting portion 217.

A restriction groove 412*b* can be defined in a front end of each of both sides of the upper edge 412. The body restriction groove 412*b* can be opened forward so as to be inserted while moving from the front to the rear with the case coupling protrusion 313*a*. In some examples, since the case coupling protrusion 313*a* can be coupled to the body restriction groove 412*b*, the touch assembly 30 and the lighting assembly 40 can be firmly coupled to each other.

A stepped portion 411*a* protruding upward along the front end of the upper base 411 in which the upper edge 412 is not formed can be further provided, and the touch case 411*a*, that is, a lower end of a curved front surface of the manipulation portion 313 can be supported by the stepped portion 411*a*.

In addition, a connector groove 412*a* can be defined in one rear side of the upper edge 412. The connector groove 412*a* can be a portion at which a cable connector 424 provided in the light substrate 421 is exposed, and when the lighting module 42 is assembled and mounted, the cable harness can easily extend to the cable connector 424. In addition, the cable harness connected to the cable connector 424 can be disposed inside the lighting assembly mounting portion 217.

The upper body 41 can include a barrier 413 that defines a space for the mounting of the lighting module 42. The barrier 413 can partition the inner space of the upper body 41. In some cases, the barrier 413 can define a space at the rear of the ice chute 24 in which the lighting module 42 is mounted.

In detail, the barrier 413 can extend upward from the top surface of the upper base 411 and can be provided along a circumference of the second half of the upper opening 410. In some cases, both ends of the barrier 413 can be connected to both sides of the upper edge 412. Thus, a space can be defined between the upper opening 410 and the rear surface of the upper edge 412 by the barrier 413.

In some examples, the barrier groove 413*a* can be defined in the barrier 413. The barrier groove 413*a* can be recessed at a position facing the chute LED 423, and thus, most of the light irradiated from the chute LED 423 may not interfere with the barrier 413 but directed to the ice chute 24. The barrier groove 413*a* can be formed at an intermediate position of the barrier 413.

In some examples, a substrate restriction portion 418, side surface fixing portions 12*c* and 41*d*, and a substrate support 412*e*, which support and fix the light substrate 421, and guide restriction portions 416 and 417 that fixe the light guide 60 can be provided inside a space defined by the barrier 413. Structures of the substrate restriction portion 418 and the guide restriction portions 416 and 417 will be described below in detail.

The upper body 41 can include a support 414. The support 414 can protrude downward from the lower surface of the upper base 411 and can be configured to support the light guide 60 from the rear. The light guide 60 can be disposed in a fixed position by the support 414, and the mounted state can be maintained.

The support 414 can be disposed along a portion of a circumference of the upper opening 410 and may extend downward. The support 414 can extend further downward than a lower end of the light guide 60. In some examples, as illustrated in FIG. 9, the support 414 can further extend downward by passing through the light guide 60 and the diffusion member 70. That is, a lower end of the support 414 can be disposed further below the lower ends of the light guide 60 and the diffusion member 70 and can support both the light guide 60 and the diffusion member 70.

The support 414 can have a curvature corresponding to that of the round portion 63 of the light guide 60 and can be provided to support the entire rear surface of the round portion 63 from the rear.

In some implementations, a base restriction groove 411*b* guiding a mounting position of the light guide 60 can be disposed at a lower surface of the upper base 411 in front of the support 414. The base restriction groove 411*b* can be recessed to accommodate the guide protrusion 633 protruding from the top surface of the light guide 60 and can allow the light guide 60 to be maintained in a mounting position.

An upper coupling portion 416 can be disposed at a lower end of the support 414. A plurality of upper coupling portions 416 can be provided along the support 414 and can protrude downward. In some cases, the upper coupling portion 416 can be disposed at a position corresponding to the lower coupling portion 436 disposed at the lower body 43 and can be coupled to the lower coupling portion 436. In some cases, the upper body 41 and the lower body 43 can be coupled by the coupling of the upper coupling portion 416 and the lower coupling portion 436.

The light guide 60 can be mounted on a lower surface of the upper body 41, and a rear end of the light guide 60 can be disposed at a position corresponding to the LED 422. Thus, when the LED 422 is turned on, the irradiated light can move along the light guide 60.

In some cases, the diffusion member 70 can be disposed at a lower surface of the upper body 41. The diffusion member 70 can be coupled to the light guide 60, and the light irradiated from the light guide 60 can be diffused and visible from the outside. In some cases, an outer end of the light guide 60 can be exposed between the upper body 41 and the lower body 43, and light can be irradiated to the outside.

The lower body 43 can support the light guide 60 from below and can be coupled to the upper body 41. The lower body 43 can be formed to be rounded at a curvature corresponding to that of each of the upper body 41 and the manipulation portion 313. In some cases, the lower body 43 can have a cylindrical or ring shape of which a portion of the rear end is cut. The lower body 43 can be injection-molded from a plastic material and can have a structure that is capable of mounting the nozzle assembly 50, supporting the diffusion member 70, and being coupled to the upper body 41.

In detail, the lower body 43 can include a lower base 434 defining a bottom surface. In some cases, a lower opening 433 can be defined in the lower base 434 to allow the ice chute 24 to pass therethrough. In some cases, the nozzle insertion portion 435 on which the nozzle 55 is mounted can be disposed at one side of the lower base 434 in front of the lower opening 433. The nozzle insertion portion 435 can extend below the lower base 434 and can be penetrated vertically so that the nozzle 55 can be inserted.

A lower edge 431 extending upward along the lower body 43 can be disposed at an outer end of the lower body 43. The lower edge 431 can extend upward to support the diffusion member 70 from below.

In some cases, an inner support 432 can be provided along a circumference of the lower opening 433 defined in the lower base 434. The inner support 432 can extend upward along the circumference of the lower opening 433, and the inner support 432 can surround and support the outer surface of the ice chute 24.

The lower coupling portion 436 coupled to the upper coupling portion 416 of the upper body 41 can be disposed at the inner surface of the lower edge 431. In some cases, an edge groove 431*a* and an edge protrusion 431*b* for the coupling of the lower cover 44 can be disposed at an outer surface of the lower edge 431. The edge groove 431*a* can be defined along an upper portion of an outer surface of the lower edge 431, and a plurality of edge grooves 431*a* can be disposed at regular intervals. In some cases, the edge protrusion 431*b* can protrude outward along the lower portion of the outer surface of the lower edge 431 and can protrude at a position spaced apart from the lower end of the lower edge 431. In some cases, a rear end coupling portion 431*c* coupled to a rear end of the lower cover 44 can be further provided at the rear end of the lower edge 431.

The lighting module 42 can further include the lower cover 44. The lower cover 44 can define an outer appearance exposed to the outside of the lighting module 42 and can be mounted on the outer surface of the lower body 43.

The lighting module 42 can have a size corresponding to the lower edge 431 of the lower cover 44 and can shield the lower edge 431 when mounted on the lower body 43. Thus, the outer appearance of the lower body 43, i.e., the outer appearance of the lighting module 42 exposed to the outside can be defined by the lower cover 44.

A cover protrusion 442 coupled to the edge groove 431*a* can be disposed at the rear surface of the lower cover 44, and a cover restriction protrusion 441, which is hooked and restricted with the edge protrusion 431*b*, can be disposed below the cover protrusion 442. In some cases, a protrusion 441 can be formed. In some cases, a cover coupling portion 443 coupled to the rear end coupling portion 431*c* can be further disposed at the rear end of the lower cover 44.

In some examples, in the lower cover 44, the cover protrusion 442 can be coupled to the edge groove 431*a*, the cover restriction protrusion 441 can be hooked and restricted with the edge protrusion 431*b*, and the cover coupling portion 443 can be coupled to the lower body 43 by being coupled to the rear end coupling portion 431*c*.

An outer surface of the lower cover 44 can have a film attached thereto, coated, or painted so that the outer appearance of the lower cover 44 can be more conspicuous. For example, the outer surface of the lower cover 44 can be coated with a metal texture. In some cases, an outer surface of the lower cover 44 can have the same color or texture as the outer plate 11.

Hereinafter, the structure of the light guide 60 and the diffusion member 70 will be described in more detail with reference to the drawings.

Figure 18:
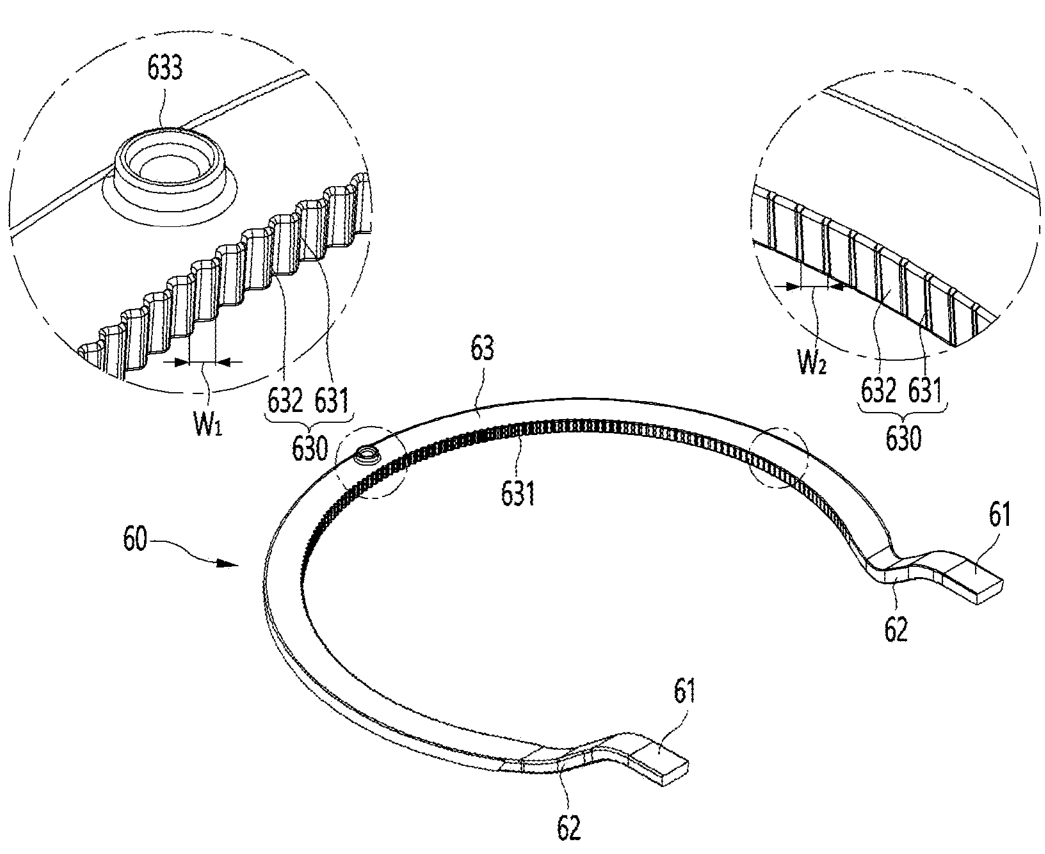
FIG. 18 is a perspective view illustrating an example state of a light guide that is one component of the lighting assembly.

FIG. 18 is a perspective view illustrating an example state of the light guide that is one component of the lighting assembly.

In some implementations, the light guide 60 can be made of a material capable of transmitting light. In some examples, the light guide 60 can be made of acrylic or plastic resin. In some examples, the light guide 60 can be made of various materials capable of uniformly transmitting the irradiated light and can be configured to contain a light transmission material as an additive. In some examples, the light guide 60 can have a ring shape as a whole and can have a shape of which one side is cut.

The light guide 60 can include an extension portion extending forward from a position corresponding to each of both the LEDs 422 and a round portion 63 seated on the support of the upper body 60 and having a ring shape. In addition, the light guide 60 can include a connection portion 62 coupling an end of the round portion 63 and the extension portion 61. The round portion 63, the connection portion 62, and the extension portion 61 can be integrally formed by injection molding.

A cross-section of a rear end of the extension portion 61 can have a rectangular shape, and a width of the rear end of the extension portion 61 may be greater than a width of each of the pair of LEDs 422. In some examples, the light irradiated from the LED 422 can be effectively transmitted toward the rear end of the extension portion 61. In addition, the extension portion 61 can extend forward by a predetermined length, and the rear end of the extension portion 61 can extend to a position that is very close to the front surface of the LED 422.

A connection portion 62 can be disposed at the front end of the extension portion 61. The connection portion 62 can extend to an end of the round portion 63 and can be disposed to be inclined or rounded to face downward as it extends forward. In some examples, the connection portion 62 can extend to pass through the upper body 41. In some examples, based on the upper base 411 of the upper body 41, the extension portion 61 can be disposed above the upper base 411, that is, in an inner space of the upper body 41, and the round portion 63 can be disposed below the upper base 411.

The round portion 63 can have a ring shape and can be formed so that a portion of the second half is cut off. In some cases, the cut rear end of the round portion 63 can be coupled to the front end of the connection portion 62. In some cases, the cross-section of the round portion 63 can have a rectangular shape or a shape having four sides. In some examples, the top surface of the round portion 63 can be in contact with the lower surface of the upper base 411, and the lower surface of the round portion 63 and the front surface of the round portion 63, i.e., an outer surface of the round portion 63 can be in contact with the diffusion member 70, and the rear surface of the round portion 63 can be in contact with the support 414. Therefore, the round portion 63 can have a mounting structure between the upper body 41 and the diffusion member 70 and have a structure that is capable of effectively transmitting light through the close contact structure with the diffusion member 70.

The round portion 63 can be disposed at a position further lower than the extension portion 61 and be in contact with the bottom surface of the upper base 411 in a state in which the light guide 60 is mounted on the upper body 41.

In addition, the round portion 63 can have a curvature corresponding to the rounded shape of the first half of the upper body 41. In some cases, the round portion 63 can be disposed along a circumference of a front end of the upper body 41.

A guide protrusion 633 can be disposed at a center of a top surface of the round portion 63. The guide protrusion 633 can be inserted into the base restriction groove **411*b* recessed from the bottom surface of the upper base 411 when the light guide 60 is mounted. Thus, movement of the light guide 60 can be prevented by the coupling of the guide protrusion 633 and the base restriction groove 411*b*, and the light guide 60 can be mounted at an accurate position. The guide protrusion 633 can be a portion of a gate defined when a material is injected during injection molding of the light guide 60**.

A pattern portion 630 can be disposed at the rear surface of the round portion 63, that is, on an inner circumferential surface of the round portion 63 facing the support 414. The pattern portion 630 can include a pattern of unevenness that is provided continuously so that the light can be directed to the outside direction (a direction away from the center of the round portion 63) including the front of the light moving along the light guide 60.

In detail, in the pattern portion 630, a plurality of grooves 631 and protrusions 632 can be continuously and repeatedly disposed. In some examples, the light irradiated through the round portion 63 can be reflected by the shape of the grooves 631 and the protrusions 632 of the pattern portion 630 in the outward direction including the front. The protrusions 632 are provided to protrude relatively compared to the grooves 631 and may have a planar shape, and all of the protrusions 631 on the pattern portion 630 can have the same height.

In some examples, the plurality of grooves 631 constituting the pattern portion 630 can be formed so that a width W1 gradually increases from the rear of the round portion 63, that is, from the portion connected to the connection portion 632 toward the front. In some cases, the plurality of grooves 631 can be formed to gradually increase in depth from the rear of the round portion 63, that is, from the portion coupled to the connection portion 62 toward the front. In some cases, the protrusions 632 between the adjacent grooves 631 can be formed to gradually increase in width W2 toward the front from the rear of the round portion 63, that is, from the portion coupled to the connection portion 62.

In some examples, light reflection can be reduced toward the rear of the round portion 63 closer to the LED 422, and the center of the round portion 63 furthest from the LED 422 can have an increased light reflection, so that light is irradiated outward with uniform brightness throughout the round portion 63.

The shape (width and depth) of the grooves 631 and the protrusions 632 can be changed gradually depending on the positions of the respective grooves 631 and the protrusions 632, and a plurality of the grooves 631 and the protrusions 632 having the same shape, and each of the grooves 631 and the protrusions 632 can be provided in stages. In some cases, the grooves 631 and the protrusions 632 in a predetermined area can have the same shape, and the shapes of the grooves 631 and the protrusions 632 can be different for each area.

Figure 19:
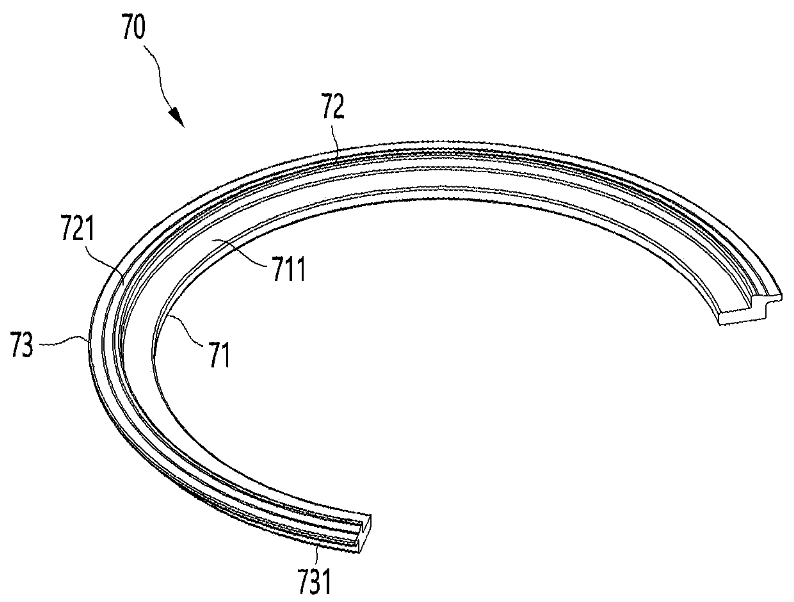
FIG. 19 is a perspective view illustrating an example state of a diffusion member that is one component of the lighting assembly.

FIG. 19 is a perspective view illustrating an example state of the diffusion member that is one component of the lighting assembly.

In some implementations, the diffusion member 70 can diffuse the light irradiated forward through the light guide 60 in the process of passing through the diffusion member 70 so as to be illuminated evenly and brightly as a whole when viewed from the outside.

In some examples, the light irradiated to the front and the outside by the pattern portion 630 can be partially shaded due to the shape of the grooves 631 and the protrusions 632, and in some cases, these shades can be exposed to the outside. However, in some examples, the light irradiated to the outside by the pattern portion 630 can be diffused as a whole in the process of passing through the diffusion member 70 so that the diffusion member 70 may be illuminated with a uniform brightness as a whole.

Thus, a portion of the diffusion member 70 exposed between the upper body 41 and the lower body 43 can emit light in a ring shape with uniform brightness, and the user can view the front and side surfaces of the dispenser 20. In some cases, it can be possible to see the ring light 730 of uniform brightness no matter where it is viewed.

In some examples, the diffusion member 70 can be made of a material capable of transmitting light and can be formed by adding a diffusion agent for light diffusion therein.

In addition, the diffusion member 70 can have a ring shape having a curvature corresponding to the shape of the round portion 63 and can be formed so that a portion of the second half is cut like the round portion 63. The diffusion member 70 can support the light guide 60 and be constrained to the ends of the upper body 41 and the lower body 43, respectively, and can have a structure in which a portion is capable of being exposed to the outside.

In detail, the diffusion member 70 can include a diffusion member base 71 defining a bottom surface of the diffusion member 70, a front extension portion 72 protruding upward from the front end of the diffusion member base 71, and an exposed portion 73 protruding forward from the front extension portion 72 and exposed through between the upper body 41 and the lower body 43.

In detail, the diffusion member base 71 can have a shape corresponding to the round portion 63, can have a predetermined width, and can be configured to be supported by the upper end of the lower edge 431. In some cases, a seating surface 711 can be disposed at the top surface of the diffusion member base 71. The seating surface 711 can include a lower surface of the round portion 63 seated therein and can be in surface contact with the entire lower surface of the round portion 63.

In some examples, the front extension portion 72 can extend vertically upward from the front end of the diffusion member base 71. In some examples, the front extension portion 72 can protrude to a height corresponding to the top surface of the round portion 63 in a state in which the round portion 63 is seated on the seating surface 711.

In some examples, the front and lower surfaces of the round portion 63 can be disposed to be in contact with the seating surface 711 and the front extension portion 72, respectively, so that a mounting state can be maintained. In some cases, the front surface of the round portion 63 and the inner surface of the front extension portion 72 can be in close contact with each other, and the light irradiated to the front and the outside through the round portion 63 can be effectively applied to the front extension portion 72) and the exposed portion 73 can be provided to pass through.

The exposed portion 73 can protrude outward from the outer surface of the front extension portion 72. The exposed portion 73 can protrude along a circumference of the front extension portion 72 and can protrude forward with a predetermined width. In some cases, the exposed portion 73 can extend in a direction crossing the front extension portion 72 and can extend outward at a height corresponding to the round portion 63.

In some examples, an inclined surface 721 can be disposed between the front extension portion 72 and the exposed part 73, and the inclined surface 721 can be in contact with the front end of the upper base 411 and the diffusion member 70.

In some examples, a stepped cover seating portion 731 can be disposed at the lower surface of the exposed portion 73 and the front surface of the front extension portion 72, and when the diffusion member 70 is mounted, an upper end of the lower cover 44 can be seated on the cover seat 731.

When the diffusion member 70 is seated on the lower body, the lower surface of the exposed portion 73 can be supported by the upper end of the lower cover 44. In some cases, the top surface of the exposed portion 73 can be provided to be in contact with the lower end of the touch case 31. In some cases, the exposed portion 73 can be disposed at the inner side of the outer surface of the manipulation portion 313 and the outer surface of the lower cover 44 and can be disposed at a relatively less protruding position.

In some implementations, as illustrated in FIG. 9, a lower inclined surface 313*c* can be provided at the lower end of the manipulation portion 313 toward the rear as it extends downward, and the upper end of the lower cover 44 can have a rear as extending upward. An upper end inclined surface 441 that face a rear side as extending upward can be formed. The extending end of the exposed portion 73 can protrude to positions corresponding to the lower end of the lower inclined surface 313*c* and the upper end of the upper inclined surface 441.

In some examples, in a state in which the touch assembly 30 and the lighting assembly 40 are coupled, the coupling portion of the light guide 60 and the diffusion member 70 may not exposed, and only a portion of the diffusion member 70 is visible. In some examples, the exposed portion 73 can have a ring shape between the touch assembly 30 and the lighting assembly 40 and can be disposed between the lower inclined surface 313*c* and the upper inclined surface 441 to be more visible.

In some examples, when the upper body 41 and the lower body 43 are coupled, the light guide 60 and the diffusion member 70 can be disposed between the upper body 41 and the lower body 43, and the light guide 60 and the diffusion member 70 can emit light in a ring shape by the lighting module, so that the exposed portion 73 can be visualized to the outside. In addition, a portion emitted to the outside by the exposed portion 73 can be referred to as a ring light 730.

Hereinafter, the structure for mounting the light guide 60 and the diffusion member 70 will be described in more detail with reference to the drawings.

Figure 20:
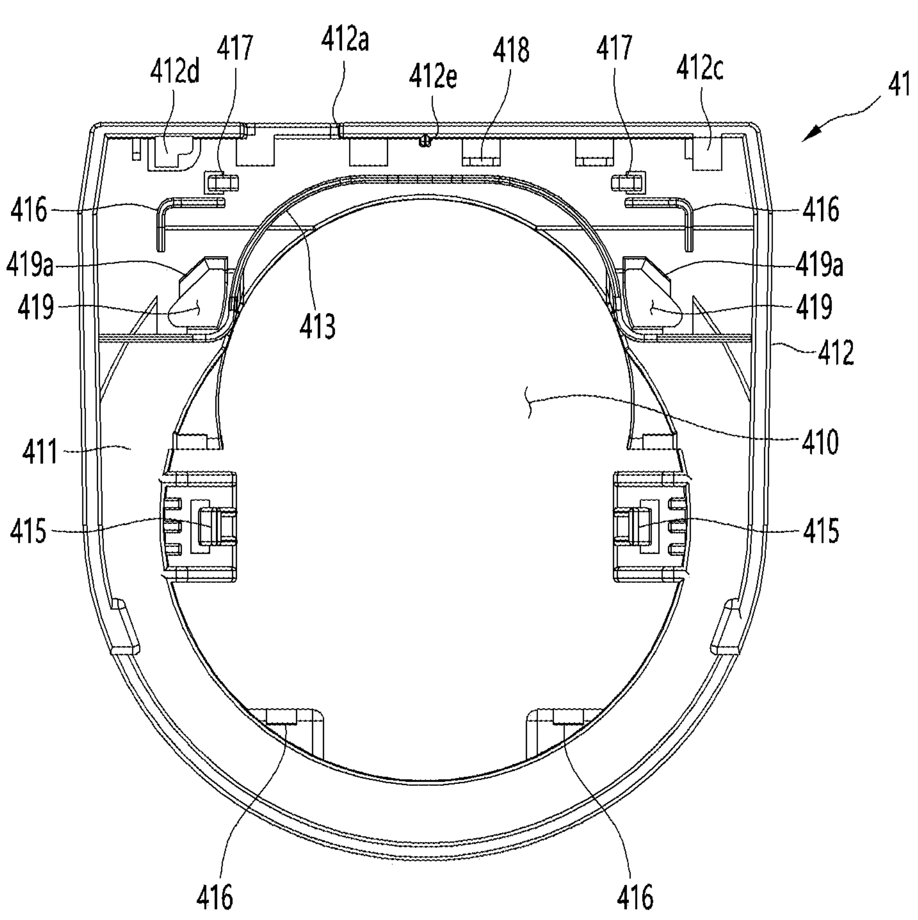
FIG. 20 is a plan view illustrating an example state of an upper body that is one component of the lighting assembly.
Figure 21:
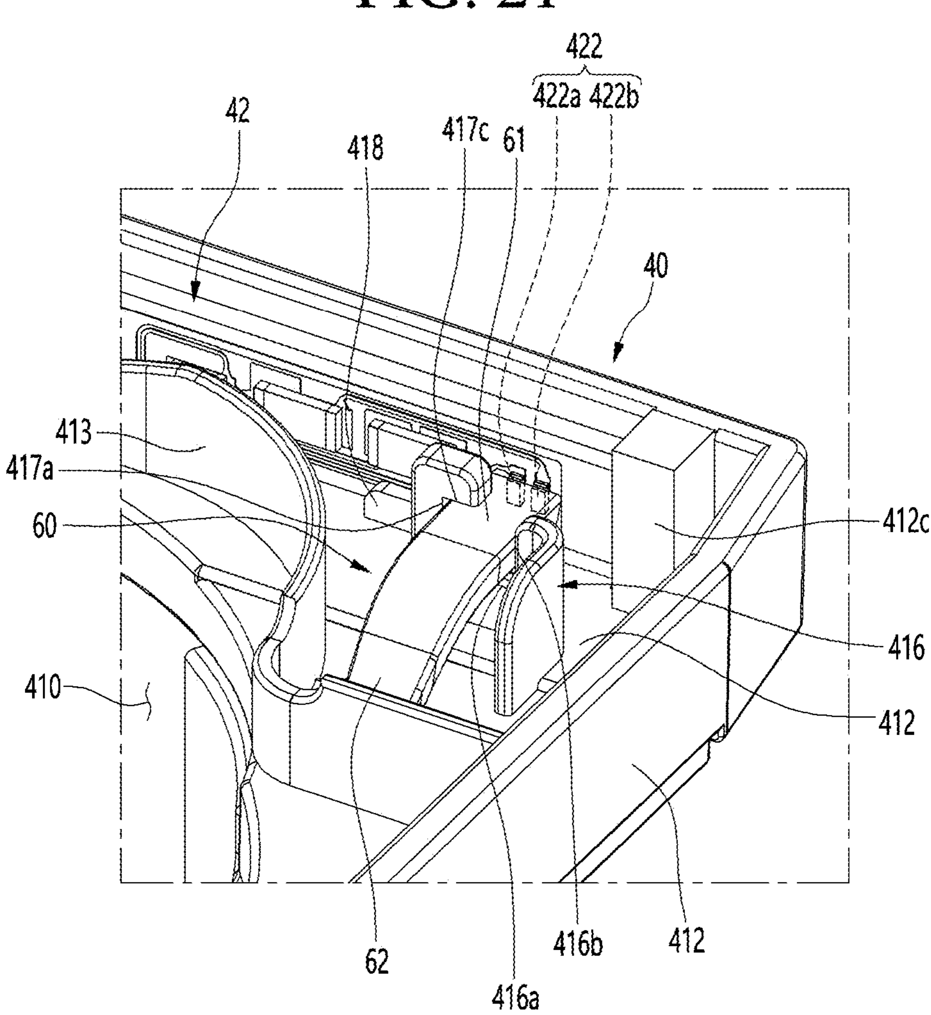
FIG. 21 is an enlarged view of a portion A of FIG. 15.
Figure 22:
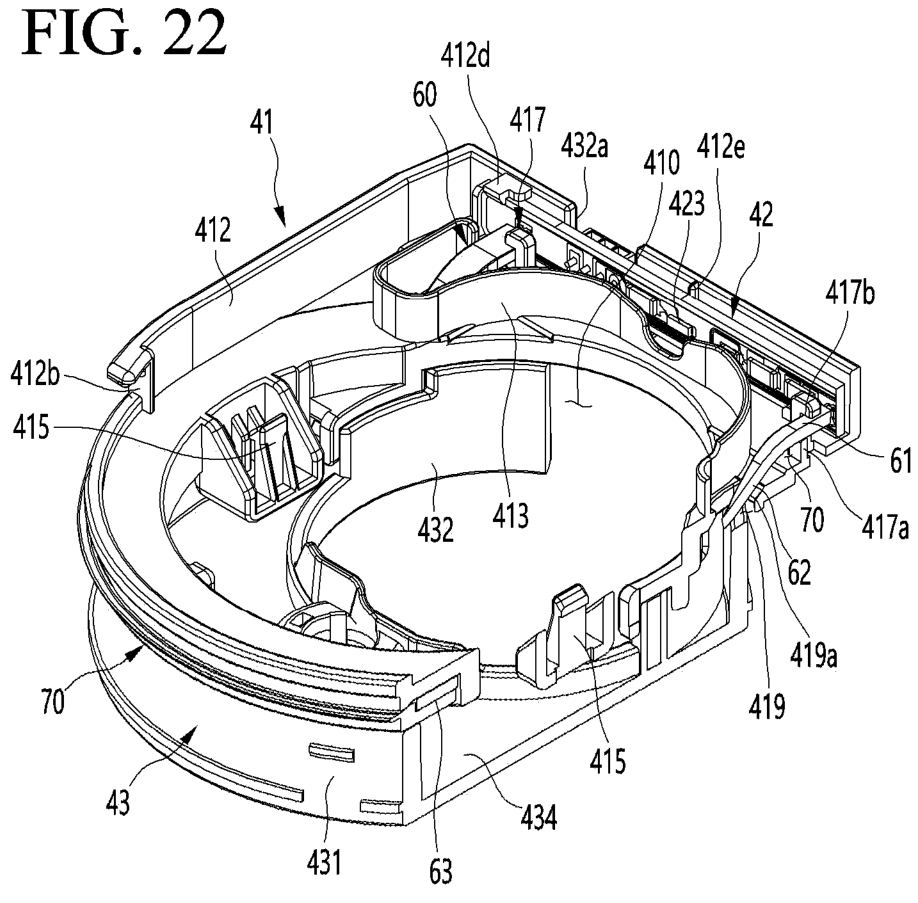
FIG. 22 is a cutaway perspective view taken along line XXII-XXII' of FIG. 15.

FIG. 20 is a plan view illustrating an example state of the upper body that is one component of the lighting assembly, FIG. 21 is an enlarged view of a portion A of FIG. 15, and FIG. 22 is a cutaway perspective view taken along line XXII-XXII' of FIG. 15.

In some implementations, the lighting module 42 can be mounted on the second half of the upper body 41. In addition, the light guide 60 can be mounted on the upper body 41, and the rear end of the light guide 60 can be disposed at a position close to the LED 422 of the lighting module 42.

In some examples, the light substrate 421 can be formed in the upper body 41 by the side fixing portions 412*c* and 412*d*, the substrate support 412*e*, and the substrate restriction portion 418 formed on the upper body 41 can be fixedly mounted.

The side fixing portions 412*c* and 412*d* can be disposed at an upper edge 412 defining the rear surface of the upper body 41. In addition, the side fixing portions 412*c* and 412*d* can protrude from positions corresponding to the left and right ends of the light substrate 421 fixing the light substrate 421 on both left and right sides, wherein left-right flow and up-down flow can be restricted. In some cases, one side fixing portion 412*c* of the side fixing portions 412*c* and 412*d* can restrict the side end of the light substrate 421, and the other side fixing portion 412*d* can restrict the side end and the top of 421.

In some examples, the substrate support 412*e* protruding forward can be further disposed at the upper edge 412. The substrate support 412*e* can be formed at a position corresponding to the central portion of the light substrate 421 and can protrude towards the rear surface of the light substrate 421 to support the light substrate 421 from the rear.

The upper base 411 can be further provided with a substrate restriction portion 418 protruding to the top. A plurality of the substrate restriction portions 418 can be disposed along the lower end of the light substrate 421 and restrict the lower front end of the light substrate 421 to prevent the light substrate 421 from moving in the front-rear direction or being separated. In some cases, the position of the light substrate 421 can be maintained while being mounted in the upper body.

In the light guide 60, the round portion 63 can be disposed along the support 414, and a mounting position can be maintained by the support 414 and the diffusion member 70. In addition, the connection portion 62 can pass through the through holes 419 disposed on both sides of the upper base 411 to extend inside the upper body 41.

The through-holes 419 can be disposed behind the barrier 413, that is, inside the space partitioned by the barrier 413 and may be defined in each of both left and right sides of the upper opening 410. In some cases, the through-holes 419 may be defined in the front along the same extension as the position of the LED 422.

In some examples, a guide seating portion 419*a* provided to be inclined or rounded can be further provided at one side and a rear side of the through-hole 419. In addition, the guide seating portion 419*a* can be formed to correspond to an inclination or a round shape of the connection portion 62. Therefore, the connection portion 62 can be maintained in a state of being seated on the guide seat portion 419*a* while passing through the through-hole 419, and the light guide 60 does not move and can be maintained in a stable mounting state.

The guide restriction portions 416 and 417 for restricting the extension portion 61 of the light guide 60 can be disposed between the through-hole 419 and the light substrate 421. The guide restriction portions 416 and 417 can protrude upward from the upper base 411 and can be disposed at a position corresponding to the arrangement position of the extension portion 61. Further, the guide restriction portions 416 and 417 can be respectively disposed in the same shape on both left and right sides to restrict the pair of extension portions 61, respectively.

The guide restriction portions 416 and 417 can include a first restriction portion 416 and a second restriction portion 417. The first restriction portion 416 and the second restriction portion 417 can be provided on both left and right sides of the extension portion 61, and can restrict the extension portion 61 from moving in the left and right directions and up and down directions.

In detail, the first restriction portion 416 can be disposed further outside (right side in FIG. 17) than the extension portion 61 and can extend upward to restrict one end of the extension portion 61. The first restriction portion 416 can include a first side restriction portion 416*b* that is in contact with one end of the extension portion 61 and a lower restriction portion 416*a* that is in contact with a lower surface of the extension portion 61. The first side restriction portion 416*b* and the lower restriction portion 416*a* can be coupled to each other to have a stepped shape and can support one edge of the extension portion 61.

In addition, the second restriction portion 417 can be disposed further inside (left in FIG. 17) than the extension portion 61 and can extend upward to restrain the other end of the extension portion 61. The second restriction portion 417 can include a second side restriction portion 417*a* that is in contact with the other end of the extension portion 61 and an upper restriction portion 417*b* that is in contact with the top surface of the extension portion 61. The second side restriction portion 417*a* and the upper restriction portion 417*b* can be coupled to each other to have a stepped shape, and can support the other edge of the extension portion 61.

Thus, when the extension portion 61 passes through the first restriction portion 416 and the second restriction portion 417, all the upper, lower, left, and right sides of the extension portion 61 can be restricted by the guide restriction portions 416 and 417. In some cases, the round portion 63 may be restricted in movement in the front and rear direction by the support 414 and the diffusion member 70, and a distance between the end of the extension portion 61 and the LED 422 may be maintained. For example, a gap between the rear end of the extension portion 61 and the front surface of the LED 422 may be maintained between about 0.5 mm and about 2 mm.

In some cases, the light guide 60 can be mounted on the upper body 41 to be maintained without moving. In some cases, the end of the extension portion 61 can be maintained at an accurate mounting position by the guide restriction portions 416 and 417 and can be disposed in front of the LED 422.

In a state in which the light guide 60 is mounted in the accurate position, the rear end of the extension portion 61 can be disposed at a position close to the front surface of the LED 422. In addition, a plurality of the LEDs 422 can be disposed in the area between the left and right side ends of the rear end of the extension portion 61, and when the LED 422 is turned on, all the light emitted from the LED 422 can be directed to the extension portion 61 so that the ring light 730 is illuminated with sufficient brightness.

Hereinafter, the operation of the dispenser 20 according to an implementation of the present disclosure will be described with reference to the drawings.

Figure 23:
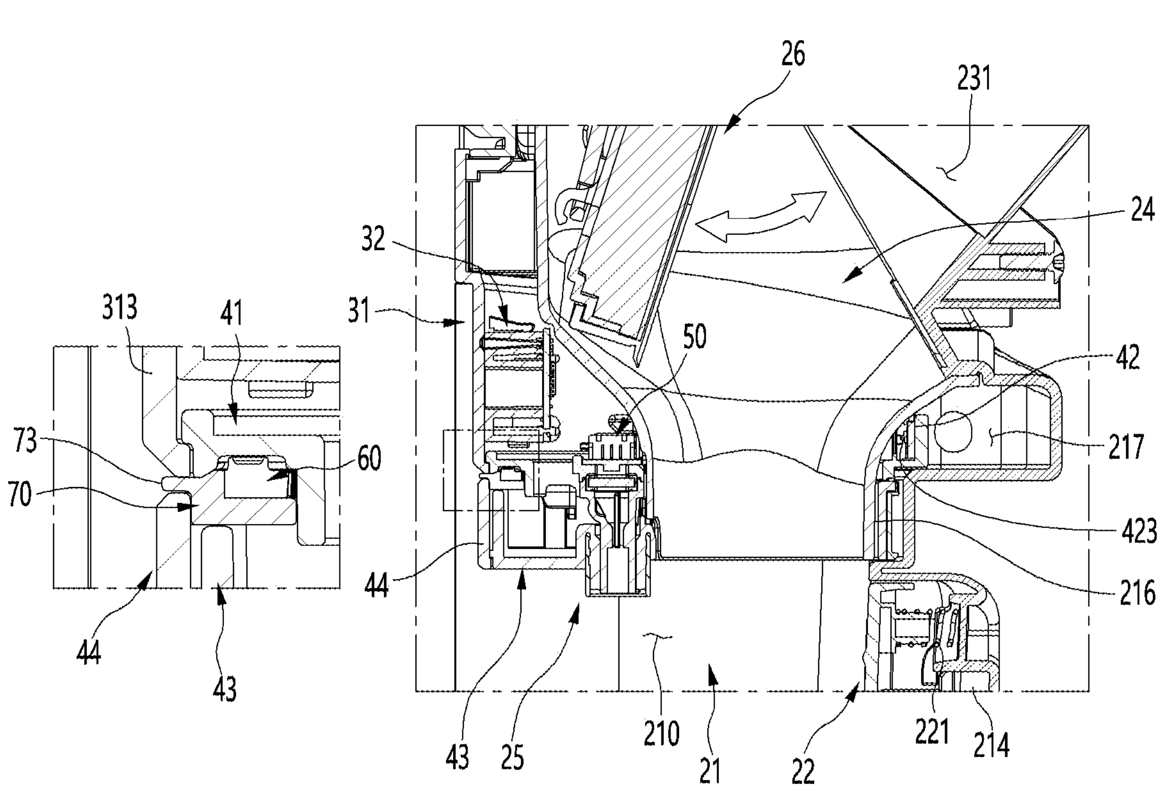
FIG. 23 is a cross-sectional view taken along line XXIII-XXIII' of FIG. 2.
Figure 24:
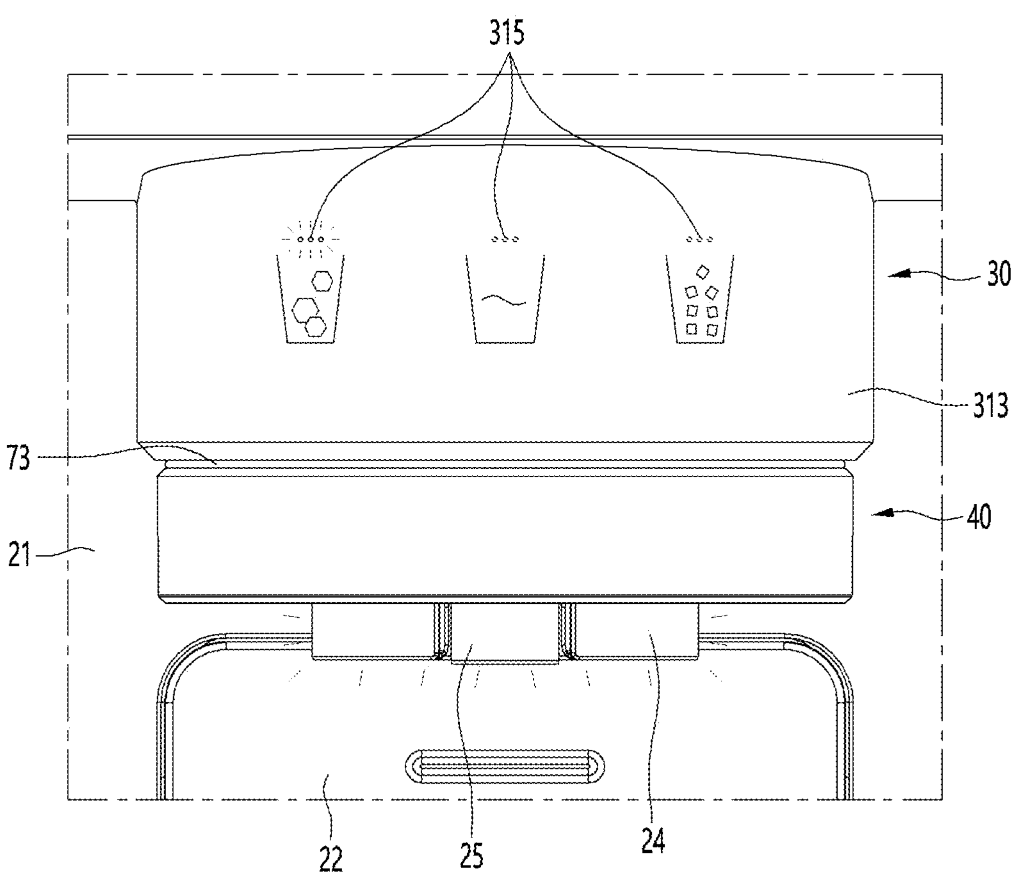
FIG. 24 is a view illustrating an example state of the dispensing portion when ice is dispensed through the dispenser.

FIG. 23 is a cross-sectional view taken along line XXIII-XXIII' of FIG. 2, and FIG. 24 is a view illustrating an example state of the dispensing portion when ice is dispensed through the dispenser.

In some implementations, the user can set the operation state of the dispenser 20 by touching the manipulation portion 313 of the touch assembly 30. In some examples, the user can set the operation state of the dispenser 20 by touching any one of the plurality of touch portions 316 provided on the manipulation portion 313, and in the set operation state, the light irradiated form the corresponding light emitting member 331 may pass through the display 315, and thus, the user can recognize the light. For example, the user can select crushed ice, cubed ice, or purified water through the manipulation portion 313, and the display 315 can display the selected menu.

In a state in which the dispenser 20 is set to the crushed ice or cubed ice discharging mode by the user, when the user operates the lever 22 to input the ice dispensing operation the shutter 26 can be opened. Then, the ice made in the ice maker 12 can move through the connection passage 23, passing through the ice chute 24, and can be discharged downward. After the operation of the lever 22 is finished or the ice is discharged, the lever 22 can be rotated to block the opening of the connection passage 23.

In some cases, before the operation of the lever 22 for dispensing the ice is performed, the state of the dispensing portion 27 can be in a state in which light is not emitted due to the LED 422 being turned off.

In some cases, when the lever 22 is operated to dispense the ice, the ice chute LED 423 can be turned on. When the ice chute LED 423 is turned on, the ice chute LED 423 irradiates light to the lower portion of the ice chute 24. Also, the light irradiated from the chute LED 423 can illuminate the ice chute 24, and in particular, the lower end of the ice chute 24 exposed below the lighting module 42 can emit light and be visualized to the outside.

Thus, the user can intuitively know that ice is being dispensed of the ice chute 24 through the brightly illuminated lower end of the ice chute 24, which is the outlet from which the ice is dispensed.

Figure 25:
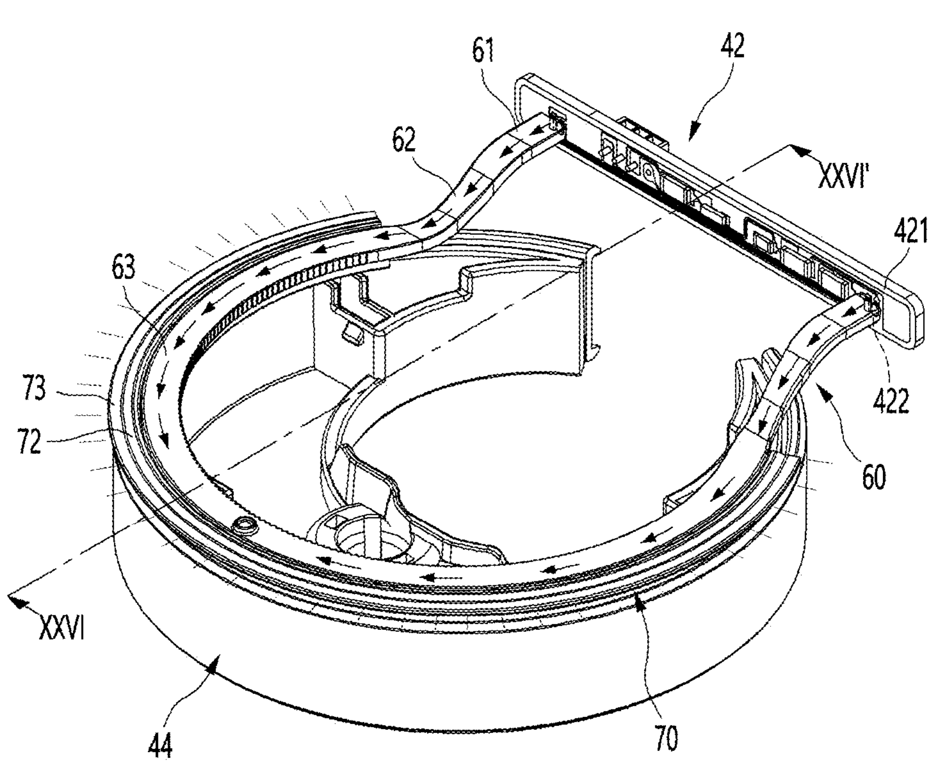
FIG. 25 is a perspective view illustrating an example of an assembled state of the light guide and the diffusion member.
Figure 26:
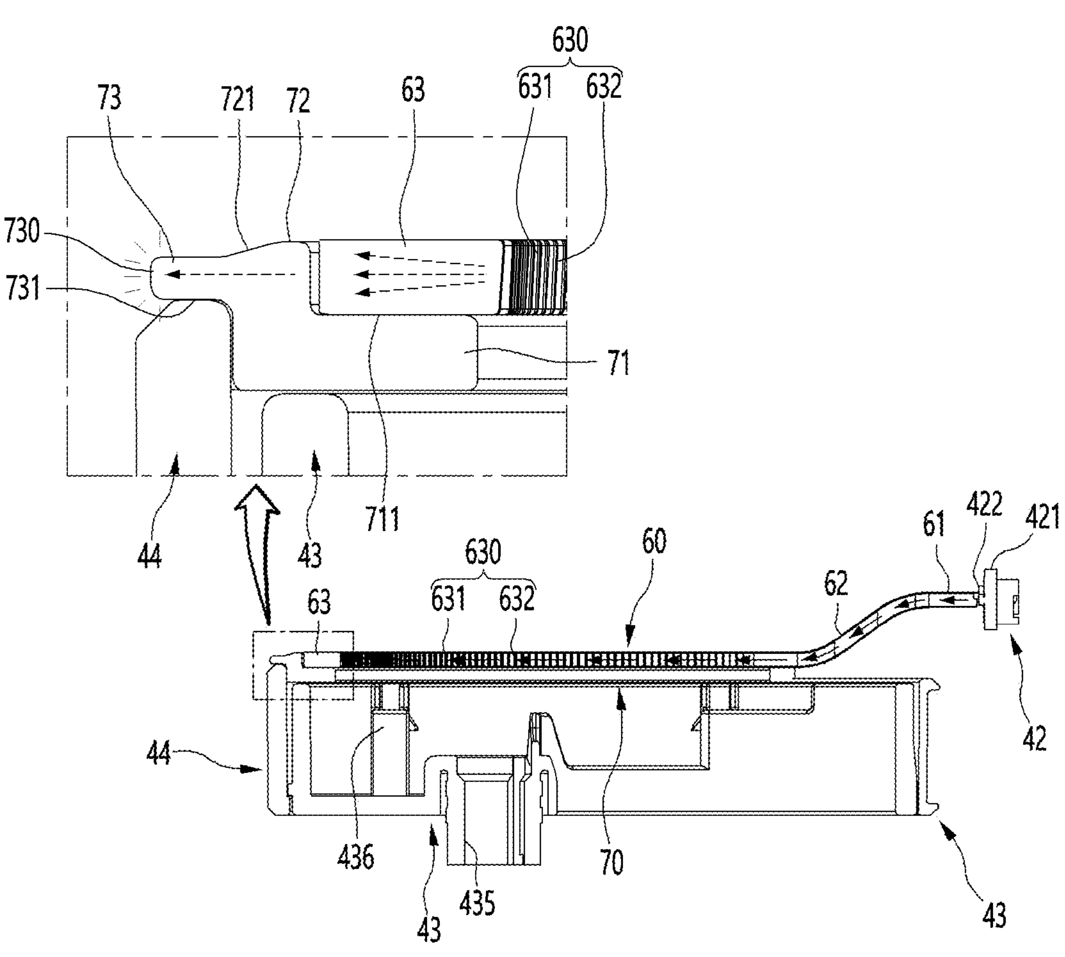
FIG. 26 is a cross-sectional view taken along line XXVI-XXVI' of FIG. 21.
Figure 27:
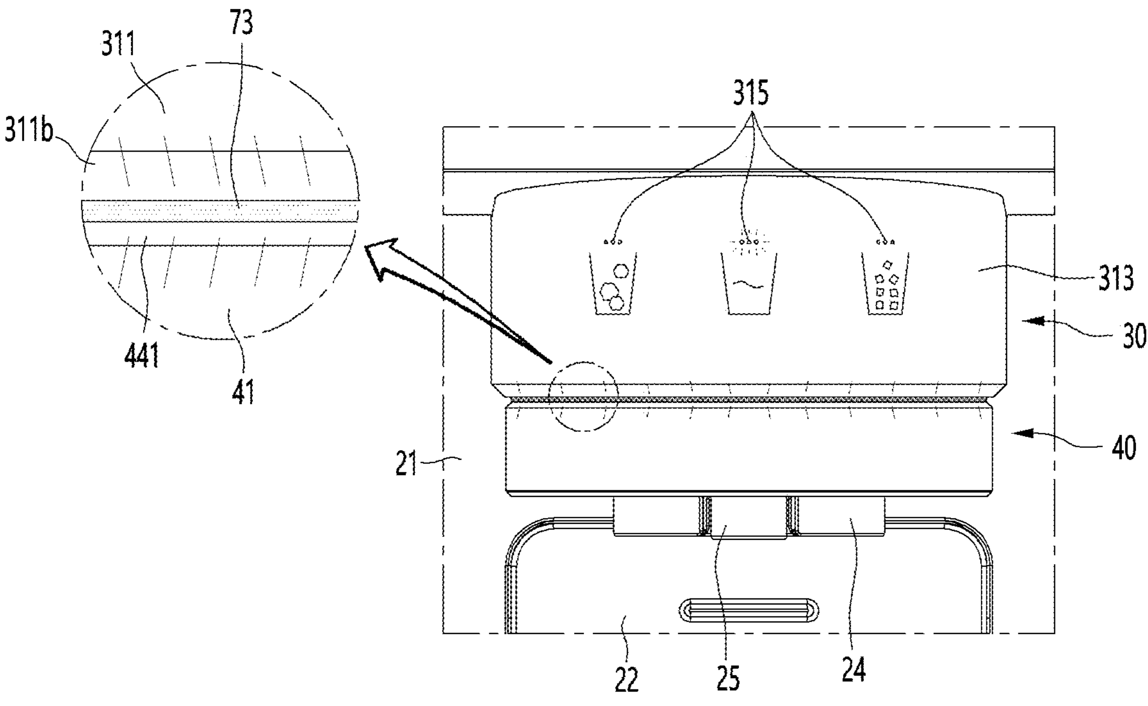
FIG. 27 is a view illustrating an example state of the dispensing portion when water is dispensed through the dispenser.

FIG. 25 is a perspective view illustrating an example of an assembled state of the light guide and the diffusion member, FIG. 26 is a cross-sectional view taken along line XXVI-XXVI' of FIG. 21, and FIG. 27 is a view illustrating an example state of the dispensing portion when water is dispensed through the dispenser.

When the dispenser 20 is set to the purified water discharging mode by the user, and the user operates the lever 22 to input the purified water dispensing operation, a valve can be opened so that water is supplied to the nozzle assembly 50 through the pipe 501, and the purified water can be discharged through the water outlet 25.

In some cases, before the operation of the lever 22 for dispensing purified water is performed, the state of the dispensing portion 27 can be in a state in which the LED 422 is turned off, and thus the ring light 730 does not emit light.

In some cases, when the lever 22 operates to dispense the purified water, water can be dispensed through the nozzle 55, and the LED 422 can be turned on at the same time. When the LED 422 is turned on, the light of the LED 422 can be irradiated to the extension portion 61 on each sides of the light guide 60, and the light can pass through the connection portion 62 and then transmitted to the round portion 63. Then, the light directed to the round portion 63 can be reflected by the pattern portion 630 and can be directed to the outside including the front side. In some cases, light can be irradiated to the outside from the entire area of the round portion 63 due to the shape of the pattern portion 630.

In some examples, the light irradiated to the outside from the round portion 63 can be diffused while passing through the diffusion member 70 that is in contact with the round portion 63, and illuminated with uniform brightness throughout the diffusion member 70. In some cases, the exposed portion 73 exposed to the outside, i.e., the ring light 730 can be illuminated in a ring shape of uniform brightness.

In some examples, when the purified water is dispensed, any one of the plurality of LEDs 422 can be operated. For example, when the extraction operation of the purified water is input, a white LED 422*b* among the plurality of LEDs 422 can be turned on, and the exposed portion 73 exposed through the water outlet 25, that is, the ring light 730 is illuminated in white.

Thus, the user can intuitively confirm that purified water is dispensed of the dispenser 20.

Figure 28:
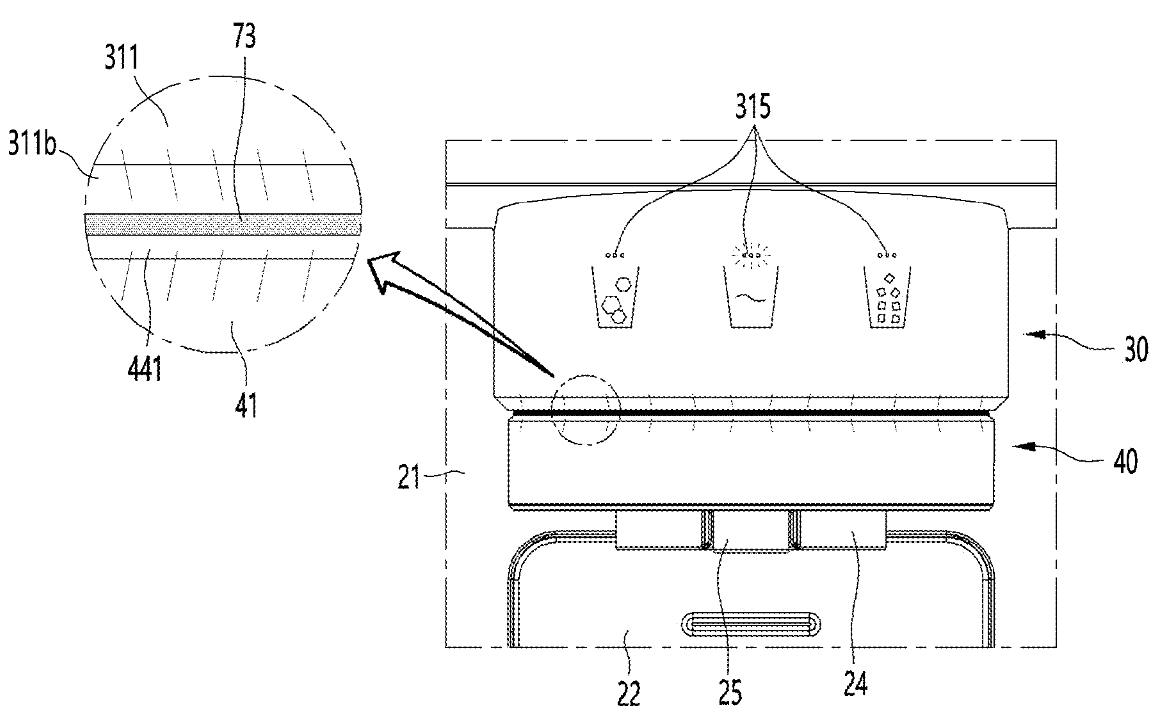
FIG. 28 is a view illustrating an example state of the dispensing portion when a nozzle of the dispenser is sterilized.

FIG. 28 is a view illustrating an example state of the dispensing portion when a nozzle of the dispenser is sterilized.

The sterilization device 52 of the nozzle assembly 50 can perform a sterilization operation by irradiating ultraviolet rays into the inside of the nozzle 55 according to a set logic. The sterilization operation can be performed every set time without being separately operated. For example, the sterilization LED 522 can be configured to be heated for about 10 minutes every about 50 minutes, and the inside of the nozzle 55 can be sterilized by the operation of the sterilization LED 522. In some examples, the operation period and operation time of the sterilization LED 522 can be adjustable according to the user's operation setting.

In some examples, the sterilization operation can be performed immediately by starting the operation at a user's desired time. In some cases, the user can directly input the sterilization operation by manipulating the manipulation portion 313 or by manipulating a separate manipulation member or display provided in the door 10, cabinet, or storage space other than the manipulation portion 313. In some cases, it can be possible to directly input the sterilization operation using a remote device using the user's mobile phone, personal computer, or remote terminal.

In some examples, when the sterilization operation starts, the LED 422 can be turned on. When the LED 422 is turned on, the light irradiated from the LED 422 can pass through the light guide 60 and be emitted through the diffusion member 70. In some examples, the exposed portion 73 exposed to the outside, that is, the ring light 730, can be illuminated in a ring shape of uniform brightness.

In some cases, when the sterilization operation starts, any one of the plurality of LEDs 422 can be operated, and in order to distinguish the operation of the LED from the operation in which the purified water is dispensed, the diffusion member 70 that is, the ring light 730 can operate to be shined in a color different from the color when the purified water is dispensed.

For example, when the start signal of the sterilization operation is input, the blue LED 422*a* among the plurality of LEDs 422 can be turned on, and the ring light 730 in the water outlet 25 illuminates in blue.

Thus, the user can intuitively confirm that the sterilization operation of the nozzle 55 is performed by the dispenser 20.

In addition to the foregoing embodiment, various implementations can be exemplified.

According to another implementation, the ring light 730 can be configured as a single ride guide. In another implementation, other components except for the light guide 60 can be the same as in the above-described implementation, and thus, the same components can be denoted by the same reference numerals, and detailed descriptions thereof will be omitted.

Figure 29:
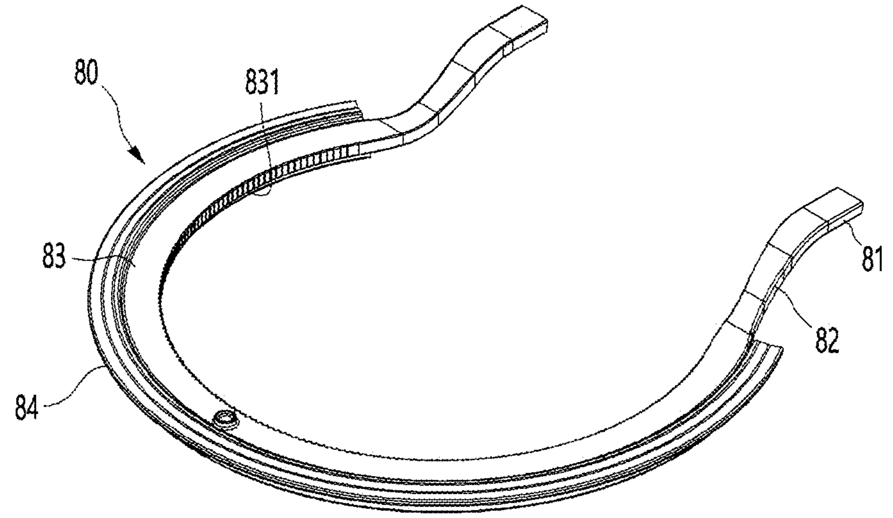
FIG. 29 is a perspective view illustrating an example state of a light guide according to another embodiment.
Figure 30:
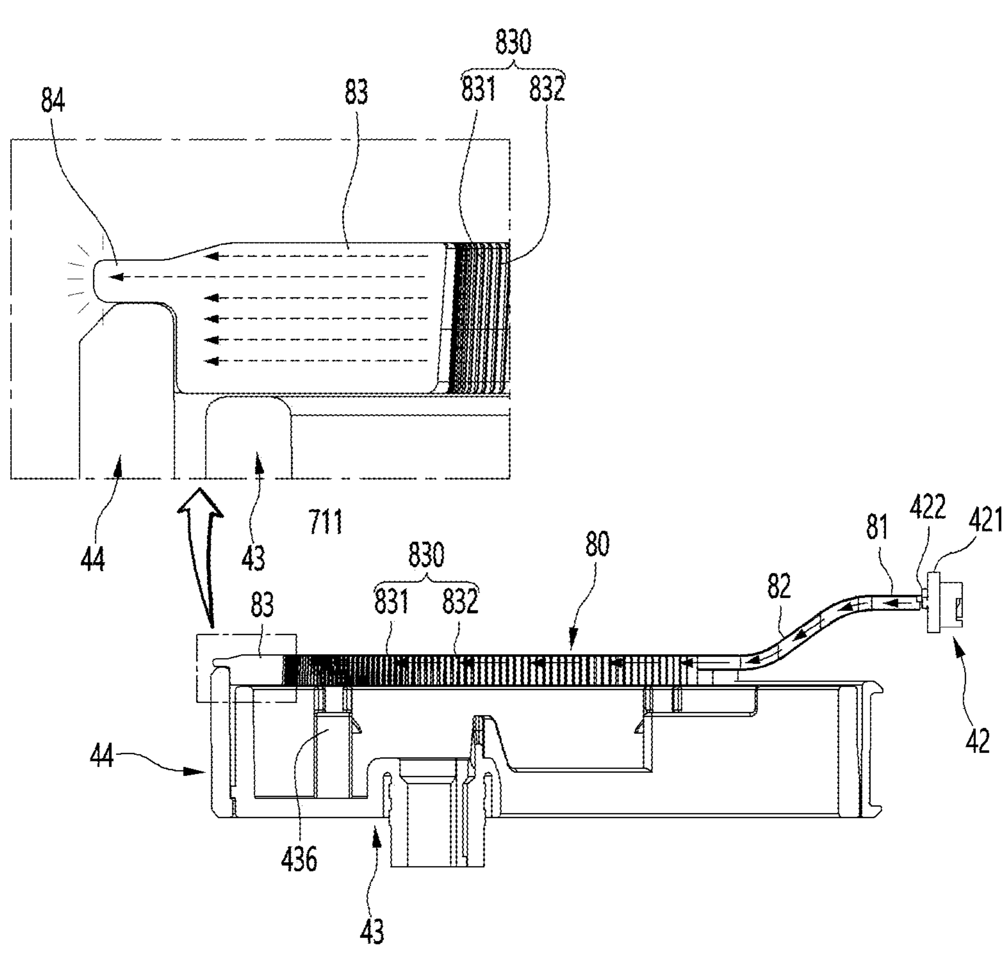
FIG. 30 is a cross-sectional view illustrating an example state in which the light guide is assembled.

FIG. 29 is a perspective view illustrating an example of a light guide according to another implementation, and FIG.

30 is a cross-sectional view illustrating an example state in which the light guide is assembled.

According to another implementation, the light guide 80 can be disposed between the upper body 41 and the lower body 43 constituting the dispenser 20, and the light guide 80. An exposed portion 84 can be exposed between the upper body 41 and the lower body 43.

The light guide 80 can include an extension portion 81 extending from the front of the LED 422, and a connection portion 82 extending downward from an end of the extended portion 81 and coupled to both ends of the round portion 83 and a round portion 83 disposed along the circumference of the upper body 41.

In some examples, a pattern portion 830 having an uneven shape can be disposed at an inner surface of the round portion 83. The pattern portion 830 can have a structure of continuous grooves 831 and protrusions 832 and can be provided in the same manner as in the above-described implementations.

In some examples, an exposed portion 84 protruding forward can be disposed at the front surface of the round portion 83. The exposed portion 84 can be disposed at a position facing the pattern area 830 and can be disposed between the upper body 41 and the lower body 43 to be exposed to the outside. Thus, the exposed portion 84 can be illuminated in a ring shape when the LED 422 is turned on and can be referred to as a ring light.

In a state in which the light guide 80 is mounted, a lower surface of the light guide 80 can be supported by an upper end of the lower body 43, that is, an upper end of the lower edge 431. In addition, a lower surface of the exposed portion 84 can be supported by an upper end of the lower cover 44.

When the LED 422 is turned on while the lighting module 42 is mounted, the light irradiated from the LED 422 can move along the light guide 80. In some cases, the light moving along the light guide 80 can be reflected to the outside including the front in the pattern portion 830, radiated to the outside through the exposure portion 84, and illuminating in a ring shape so that it can be visualized by the user.

In addition to the foregoing embodiment, various implementations may be exemplified.

In another implementation, except that an unlocking display 320 can be added to the manipulation portion 313, other components are the same as in the above-described implementation, so the same components are indicated using the same reference numerals and detailed descriptions thereof will be omitted.

Hereinafter, a dispenser according to another implementation and a refrigerator including the same will be described.

Figure 31:
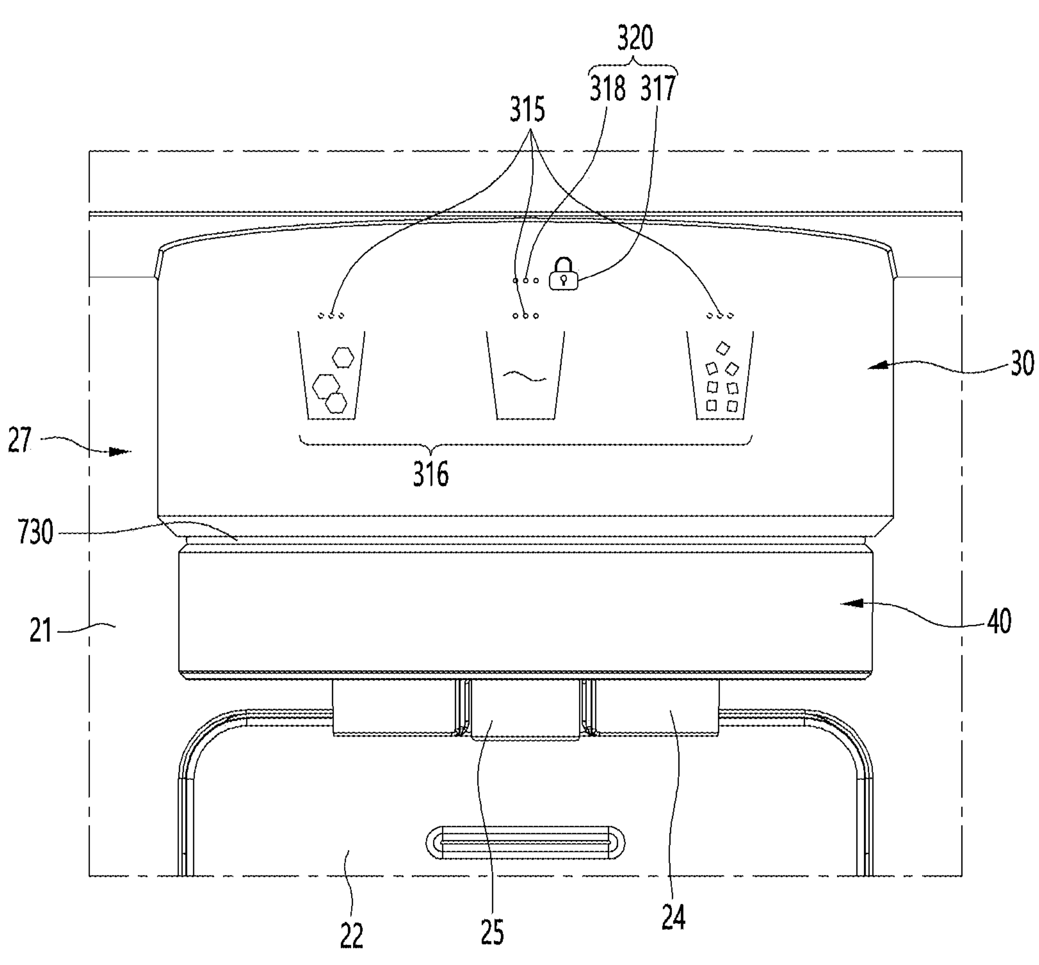
FIG. 31 is a front view illustrating an example state of a dispenser according to another embodiment.
Figure 32:
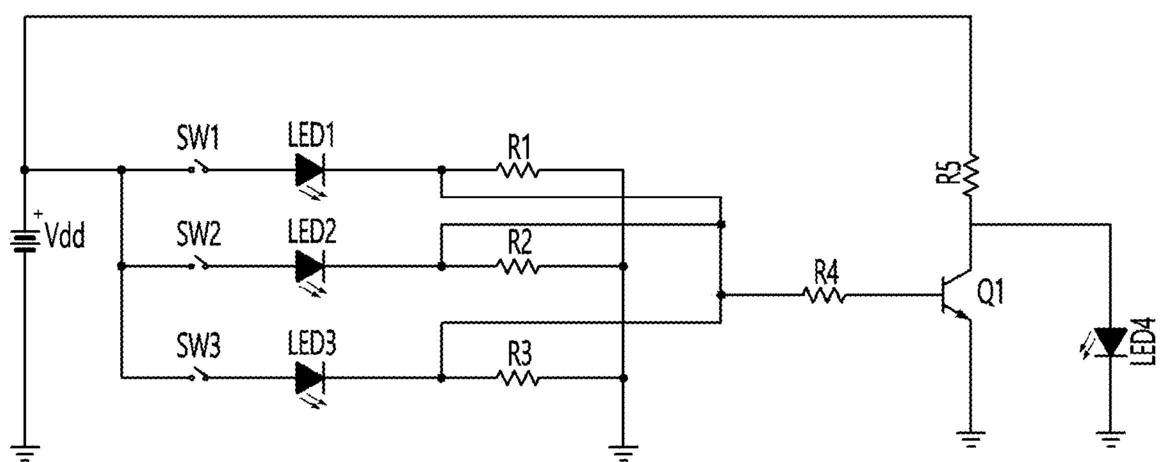
FIG. 32 is a perspective view illustrating an example state of a driving circuit of the dispenser according to another embodiment.

FIG. 31 is a front view illustrating an example state of a dispenser according to another implementation, and FIG. 32 is a perspective view illustrating an example state of a driving circuit of the dispenser according to another implementation.

According to another implementation, the unlocking display 320 can be further provided on the touch assembly 30 constituting the dispenser 20. In the unlocking display 320, for example, when the cubed ice, purified water and the crushed ice do not operate due to the input of the manipulation portion 313 or the lever 22, the unlocking display 320 can be turned on so that the user can recognize the unlocked state.

The unlocking display 320 can include a guide 317 indicating the unlocking by a figure or a symbol, and a light emitting portion 318 through which light can be transmitted. The unlocking display 320 can be disposed at the top of the touch assembly 30. Since cubed ice, purified water, or crushed ice cannot be dispensed at the same time from the unlocking display 320, the respective displays 315 indicating its operation state cannot be turned on at the same time. In some cases, when the unlocking display 320 is not in an operation state for dispensing ice or purified water, the unlocking display 320 can be turned on.

In some examples, the touch assembly 30 according to an implementation can be provided in a rounded curved surface shape, and the touch substrate 33 can have a relatively small size, so that there can be sufficient space for the unlocking display in addition to the driving circuit necessary to operate the different operations. In some cases, there may be insufficient space to add a circuit for operating the display 320.

According to another implementation, in the touch assembly 30, since there may be no situation in which each of the displays 315 that display the operation state of the cubed ice, purified water, or crushed ice is turned on at the same time, when all of the displays 315 are turned off, a circuit in which the LED of the display 320 operates can be provided.

When described in detail with reference to the drawings, SW1, SW12, and SW13 can simplify the driving circuit of cubed ice, purified water, and crushed ice with a switch, and LED1, LED12, and LED13 can be three LEDs of cube ice, purified water, and crushed ice, respectively. Also, LED4 can indicate an unlocked state.

When any one of SW1, SW2, and SW3 driving circuit operates, a current is supplied to the base of Q1 through R4 and Q1 is turned on. In some examples, LED4 can be connected to GND through Q1's Collector-Emitter and does not light up. That is, the unlocking display 320 is not turned on.

When all driving circuits of SW1, SW2, and SW3 do not operate, a current may not be supplied to the base of Q1, so LED4 can be connected through VDD and R5 and turns on. That is, the unlocking display 320 can be turned on.

In some implementations, an operation circuit for performing the operation of the unlocking display 320 on the touch substrate 33 can be included.

In addition, there may be an advantage in that the user can visually confirm whether the user's input can be received through the manipulation portion 313 or the lever 22 through the unlocking display 320.

The dispenser and the refrigerator provided with the dispenser according to the proposed implementation can have the following effects.

According to an implementation, the operation state of the dispenser can be displayed through the ring light disposed along the circumference of the dispensing portion, and thus, the operation state of the dispenser can be displayed without a separate additional display improving the assemblability and productivity of the dispenser.

In some examples, since the structure that emits light can be provided through simple structures such as the light guide, the pair of LEDs, and the substrate, the configuration can be simplified, and the productivity can be improved.

In addition, the space in which the ring light irradiates light can be minimized, and also, only the ring light portion can be exposed to the outside, and the remaining components can be disposed inside the dispensing portion achieving the compact and neat structure of the dispenser.

In addition, the sterilizer that sterilizes the nozzle can be provided in the dispenser, and even when the sterilizer operates, the operation can be displayed externally through the emission of the ring light without adding the separate display.

Therefore, the operation state of the sterilizer can be visualized to the outside, and also, the sterilization operation of the nozzle can be intuitively indicated through the operation of the ring light in the dispensing portion adjacent to the nozzle so that the user recognizes the sterilization operation.

In addition, since whether the sterilizer is in operation is visualized, the user can check the normal operation of the sterilization operation of the nozzle, and in case of an abnormal operation, the abnormal operation can be checked to ensure the operation of the sterilizer.

In addition, the LED that illuminates the ring light can be provided in plurality having the different colors, and thus, the ring light can emit light in different colors according to the dispensing of purified water and the sterilization operation so that the operation state is distinguished through the color of the ring light. Thus, the user intuitively confirm the operation state of the dispenser.

The light guide that illuminates the ring light can have the structure in which the pattern portion is formed so that the entire ring light is brightly illuminated by irradiating the light in the outward direction to reflect the light to the outside, and the uniform brightness can be secured through the arrangement of the pattern portion.

In addition, the diffusion member can be disposed at the outside of the light guide so that the light irradiated from the light guide is diffused. Therefore, the ring light may be illuminated with the uniform brightness as a whole, and the shadow of the pattern portion can be prevented from being visible to the outside.

In the dispenser, the touch assembly can be provided above the dispensing portion, and the touch device can be disposed to be in close contact with the rear surface of the touch assembly having the rounded curve shape so that the user can easily recognize the touch manipulation.

In addition, the display that displays the operation state of the dispenser can be further provided on the front surface of the touch assembly together with the touch portion. In this case, the display can be provided by partially removing the blocking layer disposed on the front surface of the touch case.

Thus, it is possible to achieve the same effect as the fine hole through which the light irradiating from the touch assembly, wherein the light is transmitted without direct transmission, and also, the display can be molded to include the fine openings having a uniform size.

According to an implementation, the touch portion disposed at the front surface of the touch assembly can detect the user's operation through the capacitive touch sensor. In addition, the transfer member that detects the user's touch can be in close contact with the rear surface of the manipulation portion provided in the curved shape by the elastic member, and thus, even if the user manipulates the touch portion disposed at the manipulation portion, the touch manipulation can be detected.

Although implementations have been described with reference to a number of illustrative embodiments thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
- a cabinet defining a storage space;
- a door configured to open and close at least a portion of the storage space;
- a dispenser provided at the door and including an ice chute and a water outlet; and
- a touch assembly provided at the dispenser,
- wherein the touch assembly includes:
  - a touch case having a rounded front surface, and
  - a touch device provided behind the touch case,
  - wherein the touch device includes:
    - a touch substrate having a flat plate shape and provided behind the rounded front surface,
    - a first touch sensor and a second touch sensor provided at the touch substrate,
    - a first elastic member provided between the first touch sensor and the touch case, and
    - a second elastic member provided between the second touch sensor and the touch case,
    - wherein a length of the first elastic member is greater than a length of the second elastic member.

2. The refrigerator according to claim 1, wherein the touch assembly is disposed inside a recessed space defined by the dispenser.

3. The refrigerator according to claim 1, wherein the touch case includes:
- a plurality of touch portions configured to set a function of the dispenser by a user's touch; and
- a plurality of display portions corresponding to each of the touch portions and configured to emit light to thereby visualize the function of the dispenser set by the user's touch.

4. The refrigerator according to claim 3, wherein the plurality of touch portions includes a plurality of portions configured to allow the user to select each of water and ice.

5. The refrigerator according to claim 3, wherein the plurality of display portions includes a plurality of micro-holes configured to transmit light from a LED provided at the touch assembly to thereby display an operation state.

6. The refrigerator according to claim 1, wherein a nozzle that is configured to discharge water is provided in front of the ice chute, wherein the ice chute is configured to discharge ice, and wherein the nozzle and the ice chute are disposed at a rear of the touch case.

7. The refrigerator according to claim 1, wherein a mounting portion hook that is configured to mount the touch device is disposed at a rear surface of the touch case.

8. The refrigerator according to claim 3, wherein a LED facing the plurality of display portions is provided at the touch substrate, and wherein the touch assembly further comprises a guide member configured to guide light emitted from the LED to the touch case.

9. The refrigerator according to claim 1, wherein the first touch sensor is provided at a center of the touch substrate, and the second touch sensor is provided at the touch substrate spaced apart from the first touch sensor.

10. The refrigerator according to claim 1, wherein the touch device further comprises a transfer member provided at an outer surface of the first elastic member, the transfer member being made of a material configured to transfer static electricity on a surface of the touch case to the first touch sensor.

11. The refrigerator according to claim 1, wherein the second elastic member includes an inclined portion inclined to further protrude forward in a direction away from the first elastic member.

12. A home appliance comprising:

a cabinet defining an internal space;

a door configured to open and close at least a portion of the internal space; and a touch assembly provided at the door;

wherein the touch assembly includes:

a touch case having a touch surface and a display surface, and a touch device provided behind the touch case, wherein the touch device includes:

a touch substrate provided behind the touch case, a touch sensor provided at the touch substrate and facing the touch surface, a light emitting member provided at the touch substrate and facing the display surface, and a guide member disposed between the touch substrate and the display surface and configured to guide light from the light emitting member to the display surface, wherein the touch case is made of a transparent material and covered by a blocking layer, and wherein a hole is provided by partially removing the blocking layer and faces the guide member.

13. The home appliance according to claim 12, wherein the touch case includes:

a plurality of touch portions configured to set a function of a dispenser by a user's touch; and a plurality of display portions corresponding to each of the touch portions and configured to emit light to thereby visualize the function of the dispenser set by the user's touch.

14. The home appliance according to claim 12, wherein the touch case is coupled to the touch substrate by a hook-shaped fixing member protruding rearward from a rear surface of the touch case.

15. The home appliance according to claim 12, wherein an elastic member is provided between the touch sensor and the touch case.

16. The home appliance according to claim 15, wherein the touch device further comprises a transfer member provided at an outer surface of the elastic member, the transfer member being made of a material configured to transfer static electricity on a surface of the touch case to the touch sensor.

17. The home appliance according to claim 12, wherein the guide member has a light hole extending to a back of the touch case, and wherein a LED is disposed inside the light hole.

18. The home appliance according to claim 17, wherein a micro-hole is formed by removing the blocking layer at a portion of the blocking layer through laser processing.

19. The home appliance according to claim 18, wherein a plurality of display portions include a plurality of micro-holes configured to transmit light from the LED and display an operation state.

20. The home appliance according to claim 18, wherein a diameter of the light hole is greater than a diameter of the micro-hole.

* * * * *